(12) United States Patent
Oshima

(10) Patent No.: US 11,081,791 B2
(45) Date of Patent: Aug. 3, 2021

(54) WIRELESS COMMUNICATION DEVICE, CONTROL METHOD, AND PROGRAM

(71) Applicant: NEC Corporation, Tokyo (JP)

(72) Inventor: Naoki Oshima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 296 days.

(21) Appl. No.: 16/342,624

(22) PCT Filed: Jul. 13, 2017

(86) PCT No.: PCT/JP2017/025555
§ 371 (c)(1),
(2) Date: Apr. 17, 2019

(87) PCT Pub. No.: WO2018/078963
PCT Pub. Date: May 3, 2018

(65) Prior Publication Data
US 2019/0237872 A1      Aug. 1, 2019

(30) Foreign Application Priority Data
Oct. 28, 2016  (JP) .............................. JP2016-211428

(51) Int. Cl.
*H01Q 3/36*  (2006.01)
*H04B 17/318*  (2015.01)
(Continued)

(52) U.S. Cl.
CPC ................ *H01Q 3/36* (2013.01); *H01Q 3/24* (2013.01); *H01Q 21/22* (2013.01); *H04B 7/086* (2013.01); *H04B 17/318* (2015.01); *H04B 7/0617* (2013.01)

(58) Field of Classification Search
CPC combination set(s) only.
See application file for complete search history.

(56) References Cited

U.S. PATENT DOCUMENTS

| 4,338,605 A | * | 7/1982 | Mims .................. H01Q 3/2635 342/373 |
| 6,188,913 B1 | * | 2/2001 | Fukagawa ............ H01Q 3/2605 455/562.1 |

(Continued)

FOREIGN PATENT DOCUMENTS

| JP | 2003298483 A | 10/2003 |
| JP | 2006270847 A | 10/2006 |

(Continued)

OTHER PUBLICATIONS

International Search Report, dated Sep. 26, 2017 from the International Bureau in counterpart International application No. PCT/JP2017/025555.

(Continued)

*Primary Examiner* — Junpeng Chen
(74) *Attorney, Agent, or Firm* — Sughrue Mion, PLLC

(57) ABSTRACT

The present invention is provided with: a plurality of antenna units each including a plurality of antenna elements and a partial synthesizer that synthesizes first output signals of the respective antenna elements and outputs a second output signal; a partial power detection means that measures signal intensities of the respective second output signals; a position determination unit that determines the position of a communication device serving as a communication target based on the measured signal intensities of the respective second output signals; a summing synthesizer that synthesizes the second output signals of the plurality of antenna units and outputs a third output signal; and a phase control unit that controls phases of the respective antenna elements such that a main lobe, which is a beam having a maximum signal intensity for the third output signal, is directed to the position of the communication device determined by the position determination unit.

5 Claims, 13 Drawing Sheets

(51) Int. Cl.
*H01Q 21/22* (2006.01)
*H01Q 3/24* (2006.01)
*H04B 7/08* (2006.01)
H04B 7/06 (2006.01)

(56) References Cited

U.S. PATENT DOCUMENTS

| | | | | |
|---|---|---|---|---|
| 6,336,033 B1* | 1/2002 | Yamaguchi | .......... | H01Q 3/2605 |
| | | | | 455/273 |
| 8,344,945 B2* | 1/2013 | Craig | ................ | H04B 7/18515 |
| | | | | 342/354 |
| 8,558,670 B2* | 10/2013 | Sugaya | ................ | H04B 7/0426 |
| | | | | 340/10.1 |
| 9,252,868 B1* | 2/2016 | Bull | .................... | H01Q 3/2605 |
| 2007/0080787 A1* | 4/2007 | Taki | .................... | H01Q 1/2216 |
| | | | | 340/10.1 |

FOREIGN PATENT DOCUMENTS

| | | | |
|---|---|---|---|
| JP | 2010220078 A | 9/2010 | |
| WO | 9856068 A1 | 12/1998 | |

OTHER PUBLICATIONS

Written Opinion, dated Sep. 26, 2017 from the International Bureau in counterpart International application No. PCT/JP2017/025555.
Takeda, S., "Chapter 8: Signal Processing with Antennas", 2013, The Institute of Electronics, Information and Communication Engineers, pp. 1-17 https://www.ieice-hbkb.org/files/04/04gun_02hen_08.pdf.

* cited by examiner

WIRELESS COMMUNICATION DEVICE, CONTROL METHOD, AND PROGRAM

This application is a National Stage Entry of PCT/JP2017/025555 filed on Jul. 13, 2017, which claims priority from Japanese Patent Application 2016-211428 filed on Oct. 28, 2016, the contents of all of which are incorporated herein by reference, in their entirety.

Technical Field

The present invention relates to a wireless communication device, a control method, and a program thereof.

Background Art

In recent years, as wireless communication has been rapidly widespread, shortage of wireless communication bands has become a problem. In order to solve shortage of frequencies, there is an increasing demand for a technique commonly referred to as beamforming as a technique for spatially improving usage efficiency of radio waves (frequencies). With reference to beamforming, radio waves to be radiated are provided with directionality in such a way that the radio waves are radiated only in a particular direction, thereby improving a quality of a signal and reducing undesired emission to other wireless devices, systems, and the like. In other words, by using beamforming, it is possible to utilize radio waves in a spatially more segmented manner.

A typical technique for beamforming includes a phased array. In a phased array, radio signals fed to a plurality of antenna elements are changed in their phases and combined, and radio waves radiated from each antenna element are combined in a space, thereby enabling the resultant radio wave to radiate in a desired direction. A phased array can achieve beamforming only by electrically adjusting a phase or an amplitude, and therefore the phased array is superior in durability to achieving high directivity beamforming by mechanically actuating an antenna element.

Meanwhile, in a communication using typical beamforming, when a power gain is reduced due to movement of a communication device being a communication target, it is unknown in which direction the communication device has moved. Therefore, PTL 1 proposes a technique in which a plurality of beams each having a different directionality are generated and a movement direction of a user is detected by means of a quality of a received signal of each beam.

CITATION LIST

Patent Literature

[PTL 1] Japanese Unexamined Patent Application Publication No. 2003-298483 A

SUMMARY OF INVENTION

Technical Problem

In the technique described in PTL 1, it is required to provide a plurality of receiving units serving as subsidiary units separately from a receiving unit for generating a beam. In order for the subsidiary receiving unit to have a different directionality from that of the main receiving unit, it is required to include a phase shifter even in the subsidiary receiving unit, which significantly increases a circuit scale in an antenna having multi elements.

Therefore, there has been a demand for a technique in which a circuit scale is small and a directionality of an antenna can be directed to a communication device being a communication target by detecting movement of the communication device being the communication target.

An object of the present invention is to provide a wireless communication device, a control method, and a program capable of solving the problem described above.

Solution to Problem

In order to achieve the object described above, a wireless communication device, according to one aspect of the present invention, includes: a plurality of antenna units each including a plurality of antenna elements and a partial synthesizer that outputs a second output signal by combining first output signals of the antenna elements; partial power detection means that measures a signal strength of each of the second output signals; a position determination unit that locates a position of a communication device being a communication target, based on the measured signal strengths of the second output signals; a summing synthesizer that outputs a third output signal by combining second output signals of the plurality of antenna units; and a phase control unit that controls a phase of the each antenna element in such a way that a main lobe being a beam having a maximum signal strength of the third output signal is directed to the position of the communication device located by the position determination unit.

A control method, according to one aspect of the present invention, includes: outputting a second output signal by combining first output signals of a plurality of antenna elements; measuring a signal strength of each of a plurality of the second output signals; locating a position of a communication device being a communication target, based on the measured signal strength of each of the second output signals; outputting a third output signal by combining the plurality of second output signals; and controlling a phase of the each antenna element in such a way that a main lobe being a beam having a maximum signal strength of the third output signal is directed to the located position of the communication device.

A program, according to one aspect of the present invention, which causes a computer to execute: outputting a second output signal by combining first output signals of a plurality of antenna elements;
measuring a signal strength of each of a plurality of the second output signals; locating a position of a communication device being a communication target, based on the measured signal strength of each of the second output signals; outputting a third output signal by combining the plurality of second output signals; and controlling a phase of the each antenna element in such a way that a main lobe being a beam having a maximum signal strength of the third output signal is directed to the located position of the communication device.

Advantageous Effects of Invention

According to the present invention, a small circuit scale can be achieved and a directionality of an antenna can be directed to a communication device being a communication target by detecting movement of the communication device being the communication target.

EXAMPLE EMBODIMENT

First Example Embodiment

The example embodiments will be described in detail below with reference to the drawings.

A configuration of a phased array receiver (wireless communication device) 1 according to a first example embodiment will be described.

Figure 1:
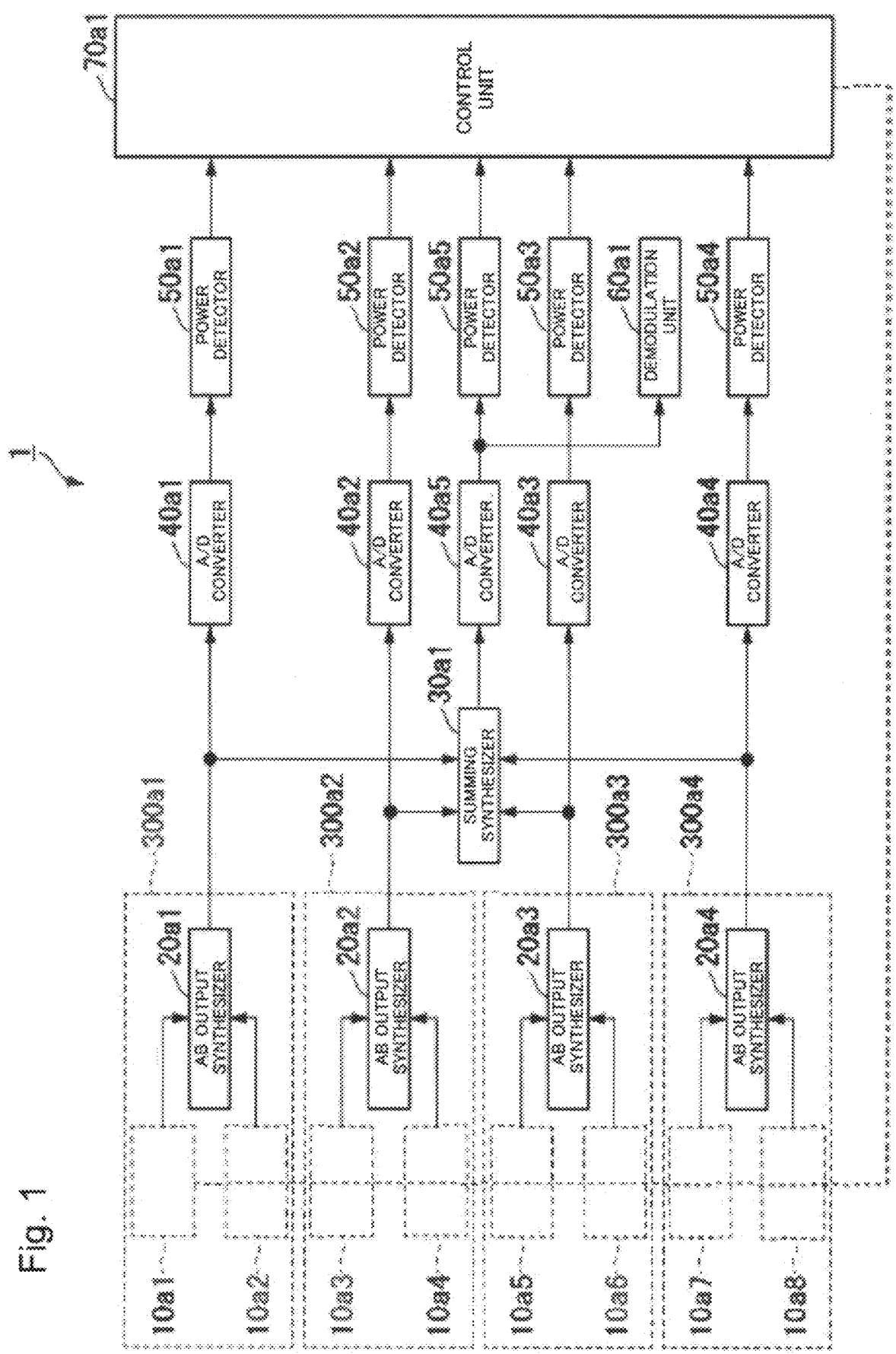
FIG. 1 is a diagram illustrating a configuration of a phased array receiver according to a first example embodiment.

The phased array receiver 1 according to the first example embodiment includes, as illustrated in FIG. 1, antenna blocks 10a1 to 10a8, antenna block output synthesizers (denoted as "AB output synthesizer" in FIG. 1) (partial synthesizers) 20a1 to 20a4, a summing synthesizer 30a1, A/D converters 40a1 to 40a5, power detectors (partial power detection means) 50a1 to 50a4, a power detector (total power detection means) 50a5, a demodulation unit 60a1, and a control unit (a phase control unit and a position determination unit) 70a1.

Hereinafter, the antenna blocks 10a1 to 10a8 are collectively referred to as antenna blocks 10a. In addition, the antenna block output synthesizers 20a1 to 20a4 are collectively referred to as antenna block output synthesizers 20a. The A/D converters 40a1 to 40a5 are also collectively referred to as A/D converters 40a. The power detectors 50a1 to 50a5 are also collectively referred to as power detectors 50a.

Figure 2:
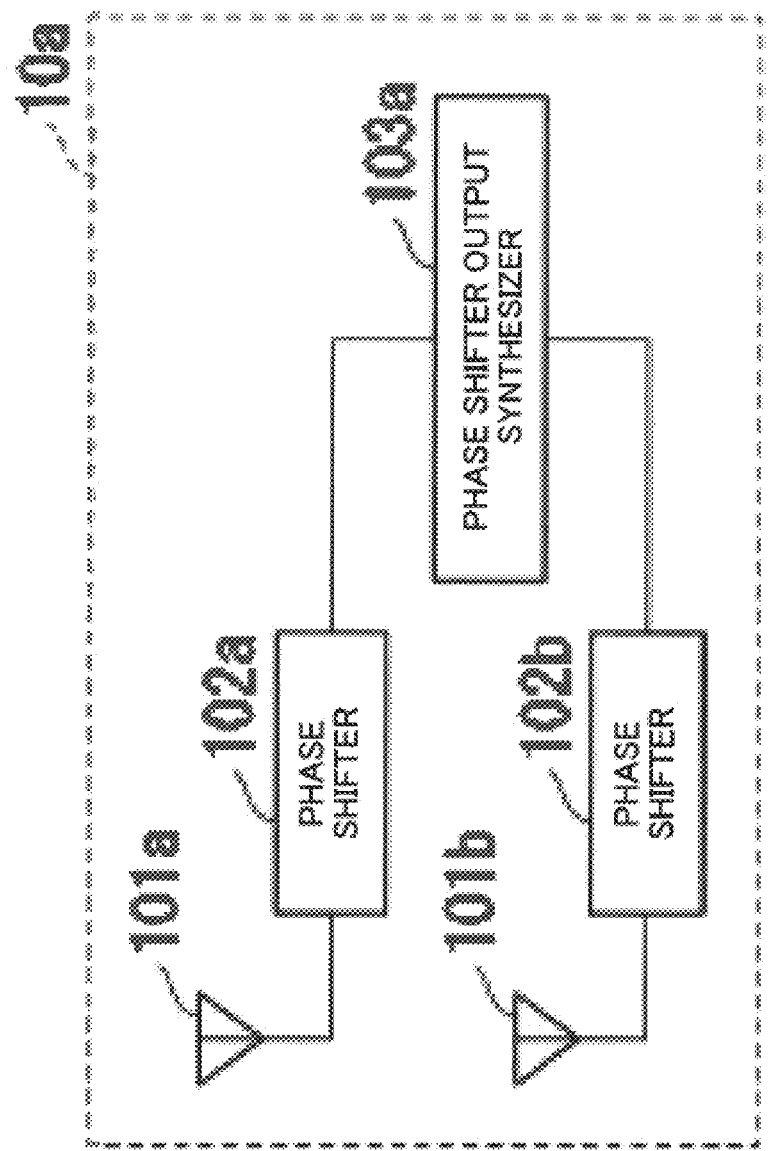
FIG. 2 is a diagram illustrating a configuration of an antenna block according to the first example embodiment.

Each of the antenna blocks 10a includes, as illustrated in FIG. 2, antenna elements 101a and 101b, phase shifters 102a and 102b, and a phase shifter output synthesizer 103a.

Each of the antenna elements 101a and 101b receives a radio wave transmitted by a transmitting device to be communicated with.

The phase shifter 102a is connected to the antenna element 101a. The phase shifter 102a adjusts, in response to a control signal from the control unit 70a1 to be described later, a phase of a signal represented by a radio wave received by the antenna element 101a. The phase shifter 102a transmits the phase-adjusted signal to the phase shifter output synthesizer 103a.

The phase shifter 102b is connected to the antenna element 101b. The phase shifter 102b adjusts, in response to a control signal from the control unit 70a1 to be described later, a phase of a signal represented by a radio wave received by the antenna element 101b. The phase shifter 102b transmits the phase-adjusted signal to the phase shifter output synthesizer 103a.

The phase shifter output synthesizer 103a receives the signal from the phase shifter 102a. In addition, the phase shifter output synthesizer 103a receives the signal from the phase shifter 102b. The phase shifter output synthesizer 103a combines the two received signals.

Note that the antenna block 10a1 includes antenna elements 101a1 and 101b1, phase shifters 102a1 and 102b1, and a phase shifter output synthesizer 103a1.

The antenna block 10a2 includes antenna elements 101a2 and 101b2, phase shifters 102a2 and 102b2, and a phase shifter output synthesizer 103a2.

The antenna block 10a3 includes antenna elements 101a3 and 101b3, phase shifters 102a3 and 102b3, and a phase shifter output synthesizer 103a3.

The antenna block 10a4 includes antenna elements 101a4 and 101b4, phase shifters 102a4 and 102b4, and a phase shifter output synthesizer 103 a4.

The antenna block 10a5 includes antenna elements 101a5 and 101b5, phase shifters 102a5 and 102b5, and a phase shifter output synthesizer 103a5.

The antenna block 10a6 includes antenna elements 101a6 and 101b6, phase shifters 102a6 and 102b6, and a phase shifter output synthesizer 103a6.

The antenna block 10a7 includes antenna elements 101a7 and 101b7, phase shifters 102a7 and 102b7, and a phase shifter output synthesizer 103a7.

The antenna block 10a8 includes antenna elements 101a8 and 101b8, phase shifters 102a8 and 102b8, and a phase shifter output synthesizer 103a8.

In this manner, in the first example embodiment, it is assumed that each antenna block 10a includes the antenna elements 101a and 101b, the phase shifters 102a and 102b, and the phase shifter output synthesizer 103a, all of which have the same suffix as that of the corresponding antenna block 10a at the end of the reference sign; the following description is made by means of the corresponding reference sign.

The phase shifter output synthesizer 103a1 transmits a combined signal to the antenna block output synthesizer 20a1.

The phase shifter output synthesizer 103a2 transmits a combined signal to the antenna block output synthesizer 20a1.

The phase shifter output synthesizer 103a3 transmits a combined signal to the antenna block output synthesizer 20a2.

The phase shifter output synthesizer 103a4 transmits a combined signal to the antenna block output synthesizer 20a2.

The phase shifter output synthesizer 103a5 transmits a combined signal to the antenna block output synthesizer 20a3.

The phase shifter output synthesizer 103a6 transmits a combined signal to the antenna block output synthesizer 20a3.

The phase shifter output synthesizer 103a7 transmits a combined signal to the antenna block output synthesizer 20a4.

The phase shifter output synthesizer 103a8 transmits a combined signal to the antenna block output synthesizer 20a4.

The antenna block output synthesizer 20a1 receives the signal from the antenna block 10a1. In addition, the antenna block output synthesizer 20a1 receives the signal from the antenna block 10a2. The antenna block output synthesizer 20a1 combines the two received signals. The antenna block output synthesizer 20a1 transmits the combined signal to the summing synthesizer 30a1 and the A/D converter 40a1.

The antenna block output synthesizer 20a2 receives the signal from the antenna block 10a3. In addition, the antenna block output synthesizer 20a2 receives the signal from the antenna block 10a4. The antenna block output synthesizer 20a2 combines the two received signals. The antenna block output synthesizer 20a2 transmits the combined signal to the summing synthesizer 30a1 and the A/D converter 40a2.

The antenna block output synthesizer 20a3 receives the signal from the antenna block 10a5. In addition, the antenna block output synthesizer 20a3 receives the signal from the antenna block 10a6. The antenna block output synthesizer 20a3 combines the two received signals. The antenna block output synthesizer 20a3 transmits the combined signal to the summing synthesizer 30a1 and the A/D converter 40a3.

The antenna block output synthesizer 20a4 receives the signal from the antenna block 10a7. In addition, the antenna block output synthesizer 20a4 receives the signal from the antenna block 10a8. The antenna block output synthesizer 20a4 combines the two received signals. The antenna block output synthesizer 20a4 transmits the combined signal to the summing synthesizer 30a1 and the A/D converter 40a4.

The summing synthesizer 30a1 receives the signal from each of the antenna block output synthesizers 20a. The summing synthesizer 30a1 combines the four received signals. The summing synthesizer 30a1 transmits the combined signal to the A/D converter 40a5.

The A/D converter 40a1 receives the signal from the antenna block output synthesizer 20a1. The A/D converter 40a1 converts the received signal from an analog signal to a digital signal. The A/D converter 40a1 transmits the converted digital signal to the power detector 50a1.

The A/D converter 40a2 receives the signal from the antenna block output synthesizer 20a2. The A/D converter 40a2 converts the received signal from an analog signal to a digital signal. The A/D converter 40a2 transmits the converted digital signal to the power detector 50a2.

The A/D converter 40a3 receives the signal from the antenna block output synthesizer 20a3. The A/D converter 40a3 converts the received signal from an analog signal to a digital signal. The A/D converter 40a3 transmits the converted digital signal to the power detector 50a3.

The A/D converter 40a4 receives the signal from the antenna block output synthesizer 20a4. The A/D converter 40a4 converts the received signal from an analog signal to a digital signal. The A/D converter 40a4 transmits the converted digital signal to the power detector 50a4.

The A/D converter 40a5 receives the signal from the summing synthesizer 30a1. The A/D converter 40a5 converts the received signal from an analog signal to a digital signal. The A/D converter 40a5 transmits the converted digital signal to the power detector 50a5 and the demodulation unit 60a1.

The power detector 50a1 receives the signal from the A/D converter 40a1. The power detector 50a1 measures a power of the received signal. The power detector 50a1 transmits a value of the measured power to the control unit 70a1.

The power detector 50a2 receives the signal from the A/D converter 40a2. The power detector 50a2 measures a power of the received signal. The power detector 50a2 transmits a value of the measured power to the control unit 70a1.

The power detector 50a3 receives the signal from the A/D converter 40a3. The power detector 50a3 measures a power of the received signal. The power detector 50a3 transmits a value of the measured power to the control unit 70a1.

The power detector 50a4 receives the signal from the A/D converter 40a4. The power detector 50a4 measures a power of the received signal. The power detector 50a4 transmits a value of the measured power to the control unit 70a1.

The power detector 50a5 receives the signal from the A/D converter 40a5. The power detector 50a5 measures a power of the received signal. The power detector 50a5 transmits a value of the measured power to the control unit 70a1.

The demodulation unit 60a1 receives the signal from the A/D converter 40a5. The demodulation unit 60a1 demodulates the received signal.

The control unit 70a1 receives the value of the measured power from each of the power detectors 50a. The control unit 70a1 calculates a power gain from the received value of the power. The control unit 70a1 transmits, to the phase shifter 102a, a control signal for adjusting phases of the phase shifter 102a according to the calculated power gain, i.e., the strength of the received signal. In addition, the control unit 70a1 transmits, to the phase shifter 102b, a control signal for adjusting phases of 102b according to the calculated power gain.

Note that a method for calculating an amount of the phase to be adjusted in performing beamforming is described in, for example, non-patent literature, Shigeki Takeda, "Chapter 8: Signal Processing with Antennas", February 2013, The Institute of Electronics, Information and Communication Engineers (IEICE), URL: http://www.ieice-hbkb.org/files/04/04gun_02hen_08.pdf [the search made on Oct. 17, 2016].

An array antenna 101 of the phased array receiver 1 is composed of the antenna elements 101a and 101b. Each of the antenna elements 101a and 101b is omnidirectional.

Figure 3:
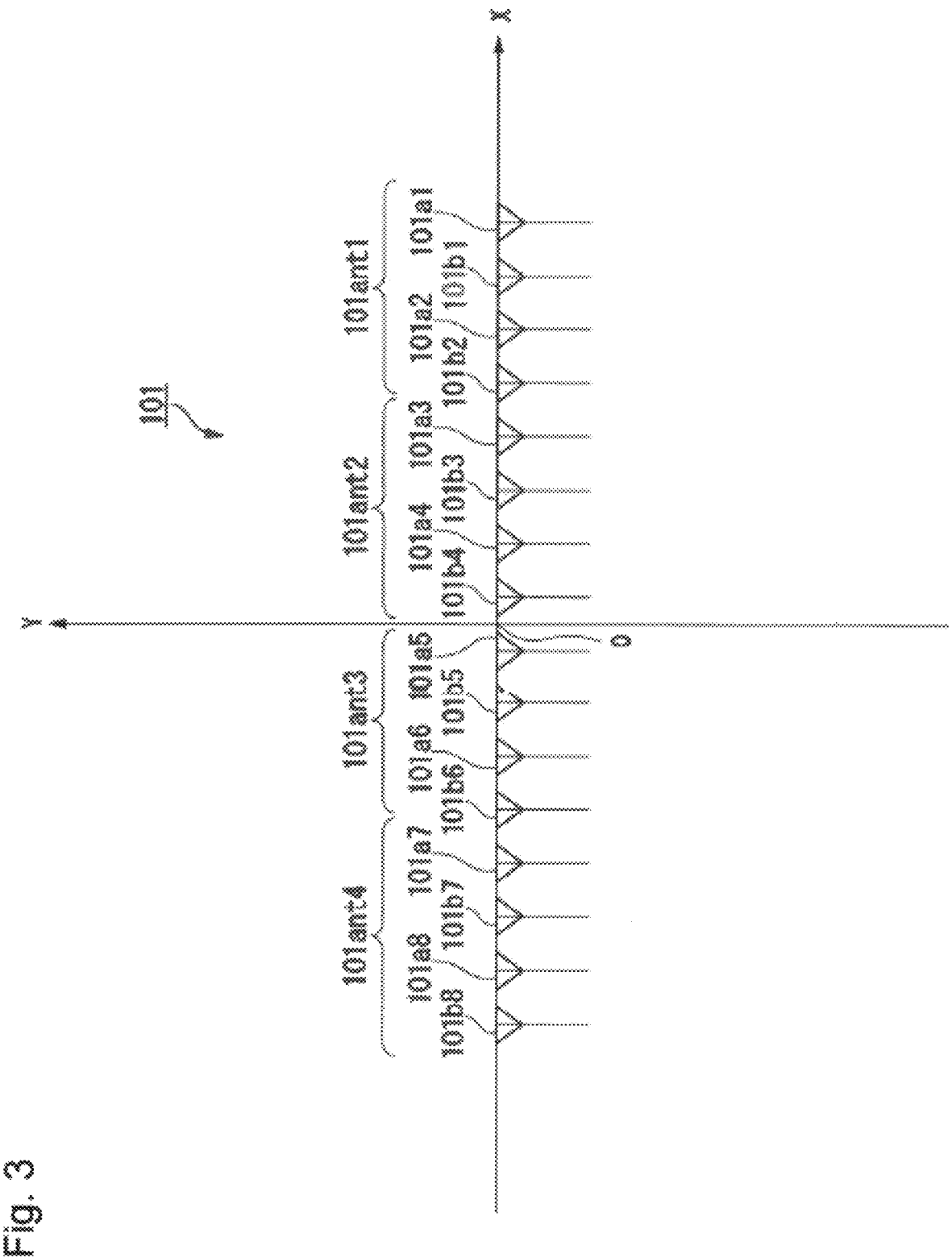
FIG. 3 is a diagram illustrating an antenna element constituting an antenna according to the first example embodiment.

The antenna elements constituting the array antenna 101 are arranged in the array antenna 101, as illustrated in FIG. 3, in a straight line at equal intervals in the order of the antenna elements 101a1, 101b1, 101a2, 101b2, 101a3, 101b3, 101a4, 101b4, 101a5, 101b5, 101a6, 101b6, 101a7, 101b7, 101a8, and 101b8.

In FIG. 3, it is assumed that the center of the array antenna 101, i.e., the middle position between the antenna element 101b4 and the antenna element 101a5 is the origin O and that a direction from the origin O toward the antenna element 101a1 is the positive direction of the X-axis. Further, it is assumed that an axis perpendicular to the X-axis and passing the origin O is Y-axis.

In addition, the positive direction of the X-axis starting from the origin O is defined as an angle of 0 degrees, and an angle of 360 degrees is defined for a full circle from the angle of 0 degrees in a counterclockwise direction around the origin O on the X-Y plane.

Note that, in the first example embodiment, it is defined that a single antenna unit is composed of a functional unit from the antenna elements 101a and 101b to the synthesizer serving as a stage preceding the A/D converter 40a, in which a signal passes through; in other words, a single antenna unit is composed of the antenna elements 101a and 101b each having the same directionality and the antenna block output synthesizer 20a (partial synthesizer) that combines signals received by the antenna elements 101a and 101b.

More specifically, the antenna blocks 10a1 and 10a2 and the antenna block output synthesizer 20a1 (partial synthesizer) constitute an antenna unit 300a1. In addition, the antenna blocks 10a3 and 10a4 and the antenna block output synthesizer 20a2 (partial synthesizer) constitute an antenna unit 300a2. In addition, the antenna blocks 10a5 and 10a6 and the antenna block output synthesizer 20a3 (partial synthesizer) constitute an antenna unit 300a3. In addition, the antenna blocks 10a7 and 10a8 and the antenna block output synthesizer 20a4 (partial synthesizer) constitute an antenna unit 300a4. In the first example embodiment, the antenna units 300a1, 300a2, 300a3, and 300a4 are also referred to as antenna units 300a.

Specific Example 1

Figure 4:
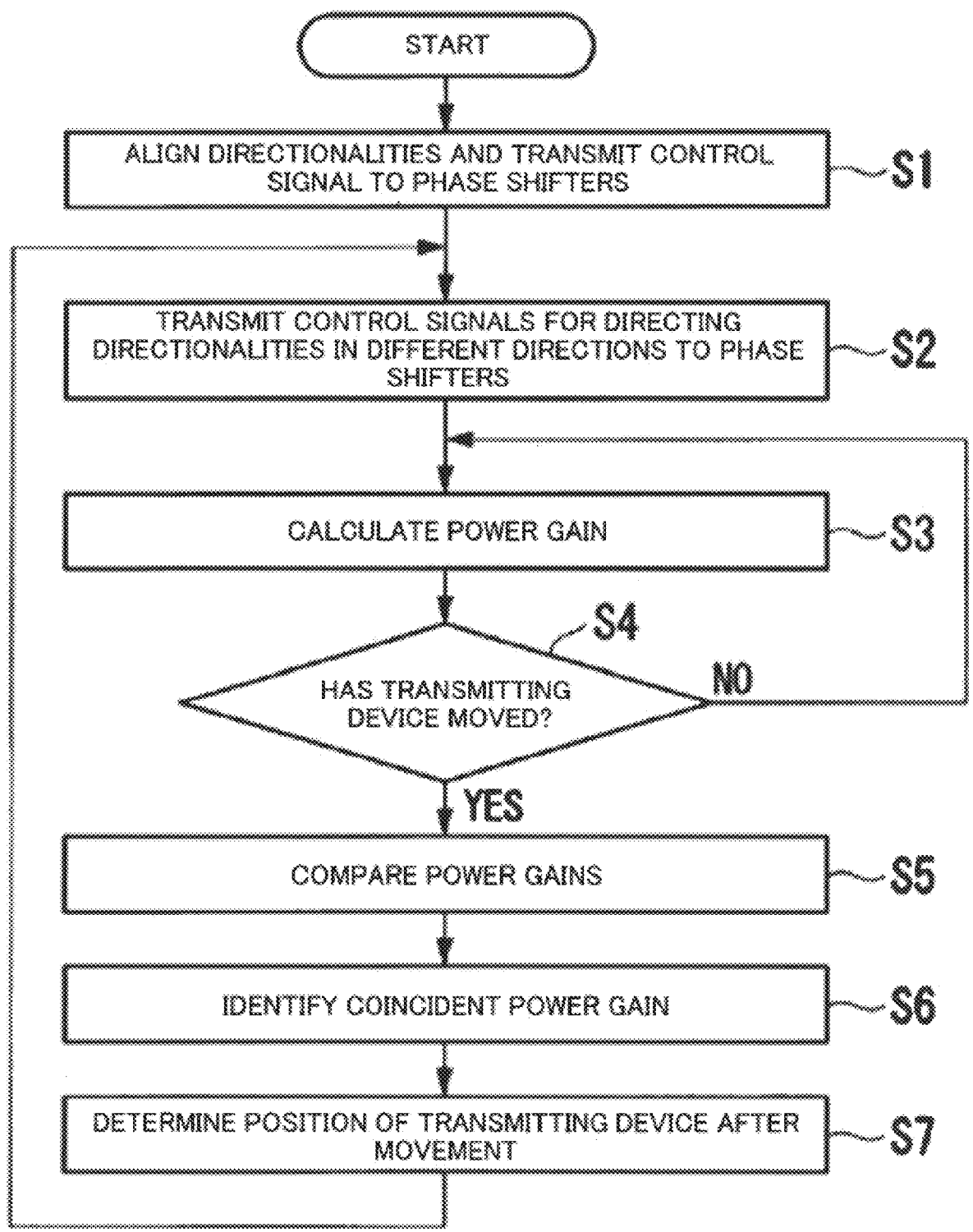
FIG. 4 is a diagram illustrating a processing sequence of the phased array receiver according to the first example embodiment.

Next, the processing sequence illustrated in FIG. 4 will be described, in which the phased array receiver 1 according to the first example embodiment detects movement of a transmitting device to be communicated with.

Note that, in the first example embodiment, the antenna elements 101a1, 101b1, 101a2, and 101b2 are referred to as a first partial antenna 101ant1. The antenna elements 101a3, 101b3, 101a4, and 101b4 are referred to as a second partial antenna 101ant2. The antenna elements 101a5, 101b5, 101a6, and 101b6 are referred to as a third partial antenna 101ant3. In addition, the antenna elements 101a7, 101b7, 101a8, and 101b8 are referred to as a fourth partial antenna 101ant4.

Immediately after the phased array receiver 1 according to the first example embodiment starts communication, the control unit 70a1 aligns four directionalities of the first partial antenna 101ant1 to the fourth partial antenna 101ant4 and transmits, to each of the phase shifters 102a and 102b, a control signal for directing the directionalities, by means of a technique such as the beamformer method, in a direction where the strength of a radio wave is strong, i.e., a direction where a power indicated by the power detector 50a5 is maximum (step S1).

More specifically, the control unit 70a1 varies, for example, by varying a value of the control signal, orientations of four main lobes from 0 degrees and 360 degrees, the four main lobes of the first partial antenna 101ant1 to fourth partial antenna 101ant4 being directed in the same direction. The control unit 70a1 identifies a control signal with which the power indicated by the power detector 50a5 is maximum.

Note that the control signal transmitted by the control unit 70a1 to each of the phase shifters 102a and 102b includes, for example, a multiplying factor with respect to a unit vector in a direction of 0 degrees (the positive direction of the X-axis) illustrated in FIG. 3, a sign indicating the positive direction or the negative direction of the X-axis, a multiplying factor with respect to a unit vector in a direction of 90 degrees (the positive direction of the Y-axis), and a sign indicating the positive direction or the negative direction of the Y-axis.

The control unit 70a1 determines, for each of the first partial antenna 101ant1 to the fourth partial antenna 101ant4, the multiplying factor with respect to the unit vector in the direction of 0 degrees, the sign indicating the positive direction or the negative direction of the X-axis, the multiplying factor with respect to the unit vector in the direction of 90 degrees, and the sign indicating the positive direction or the negative direction of the Y-axis. Furthermore, with respect to the first partial antenna 101ant1, the control unit 70a1 multiplies the unit vector in the direction of 0 degrees by the determined multiplying factor and directs the multiplied vector in the direction indicated by the determined sign, and multiplies the unit vector in the direction of 90 degrees by the determined multiplying factor and directs the multiplied vector in the direction indicated by the determined sign. The control unit 70a1 combines two multiplied vectors; thus, the control unit 70a1 can determine an angle of a direction of the combined vector as a directionality of the first partial antenna 101ant1. In addition, with respect to the second partial antenna 101ant2, the control unit 70a1 multiplies the unit vector in the direction of 0 degrees by the determined multiplying factor and directs the multiplied vector in the direction indicated by the determined sign, and multiplies the unit vector in the direction of 90 degrees by the determined multiplying factor and directs the multiplied vector in the direction indicated by the determined sign. The control unit 70a1 combines two multiplied vectors; thus, the control unit 70a1 can determine an angle of a direction of the combined vector as a directionality of the second partial antenna 101ant2. In addition, with respect to the third partial antenna 101ant3, the control unit 70a1 multiplies the unit vector in the direction of 0 degrees by the determined multiplying factor and directs the multiplied vector in the direction indicated by the determined sign, and multiplies the unit vector in the direction of 90 degrees by the determined multiplying factor and directs the multiplied vector in the direction indicated by the determined sign. The control unit 70a1 combines two multiplied vectors; thus, the control unit 70a1 can determine an angle of a direction of the combined vector as a directionality of the third partial antenna 101ant3. In addition, with respect to the fourth partial antenna 101ant4, the control unit 70a1 multiplies the unit vector in the direction of 0 degrees by the determined multiplying factor and directs the multiplied vector in the direction indicated by the determined sign, and multiplies the unit vector in the direction of 90 degrees by the determined multiplying factor and directs the multiplied vector in the direction indicated by the determined sign. The control unit 70a1 combines two multiplied vector; thus, the control unit 70a1 can determine an angle of a direction of the combined vector as a directionality of the fourth partial antenna 101ant4.

In addition, the control unit 70a1 further combines the combined vectors for the first partial antenna 101ant1 to the fourth partial antenna 101ant4; thus, the control unit 70a1 can determine a direction of a main lobe, the signal strength of which beam is maximum, of the signal obtained by the entire phased array receiver 1 according to the first example embodiment.

The control unit 70a1 transmits, to each of the phase shifters 102a and 102b, a control signal for directing each directionality of the first partial antenna 101ant1 to the fourth partial antenna 101ant4 in a different direction (step S2).

More specifically, for example, when the direction in which the power indicated by the power detector 50a5 is maximum is a direction of 80 degrees on the X-Y plane, the control unit 70a1 transmits, to each of the phase shifters 102a1, 102b1, 102a2, and 102b2, a control signal for directing the orientation of the main lobe of the first partial antenna 101ant1 in a direction of 65 degrees. In addition, the control unit 70a1 transmits, to each of the phase shifters 102a3, 102b3, 102a4, and 102b4, a control signal for directing the orientation of the main lobe of the second partial antenna 101ant2 in a direction of 75 degrees. In addition, the control unit 70a1 transmits, to each of the phase shifters 102a5, 102b5, 102a6, and 102b6, a control signal for directing the orientation of the main lobe of the third partial antenna 101ant3 in a direction of 85 degrees. In addition, the control unit 70a1 transmits, to each of the phase shifters 102a7, 102b7, 102a8, and 102b8, a control signal for directing the orientation of the main lobe of the fourth partial antenna 101ant4 in a direction of 95 degrees.

The control unit 70a1 calculates a power gain for every predetermined time interval (step S3).

Figure 5:
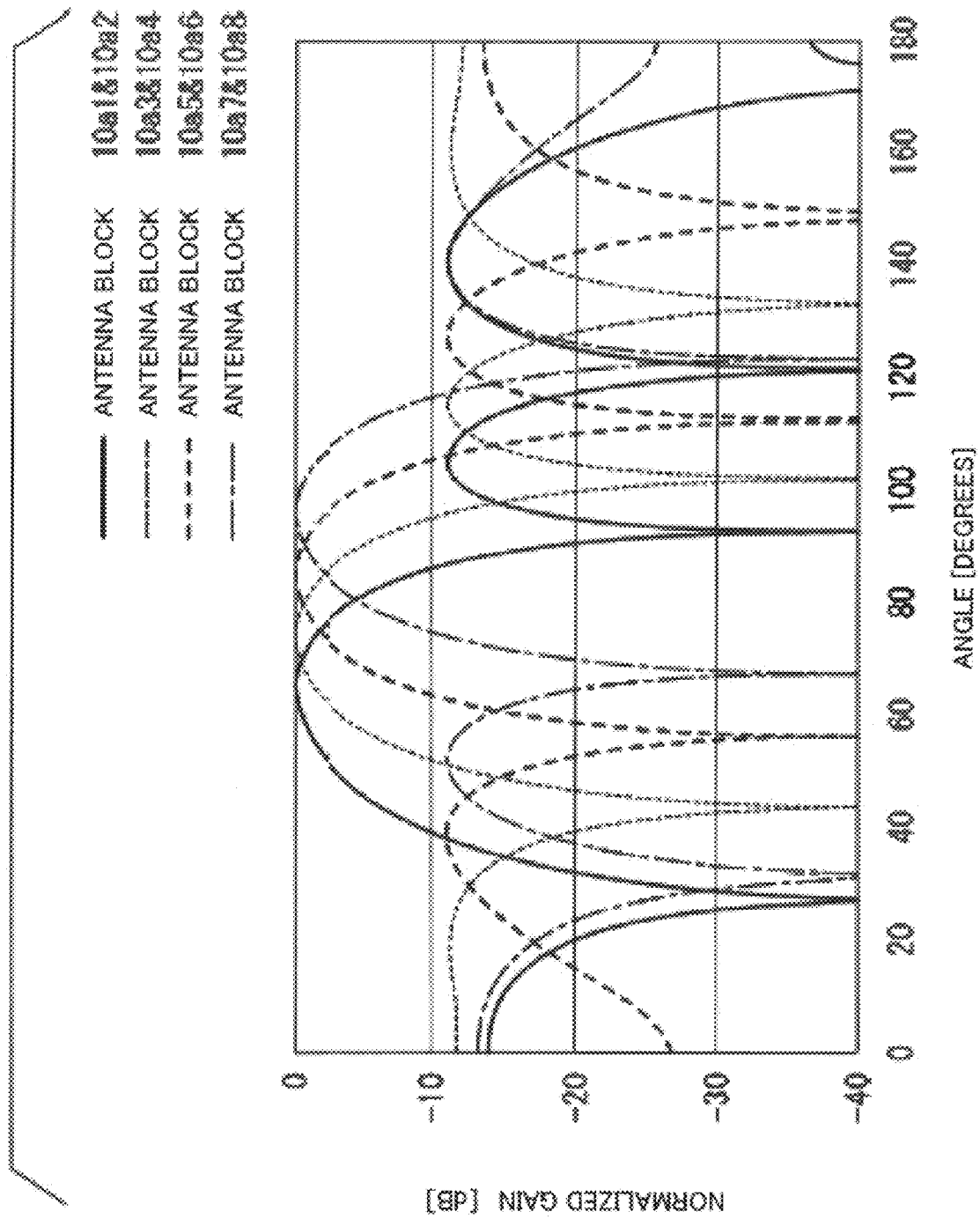
FIG. 5 is a first diagram illustrating a radiation pattern of an array antenna according to the first example embodiment.
Figure 6:
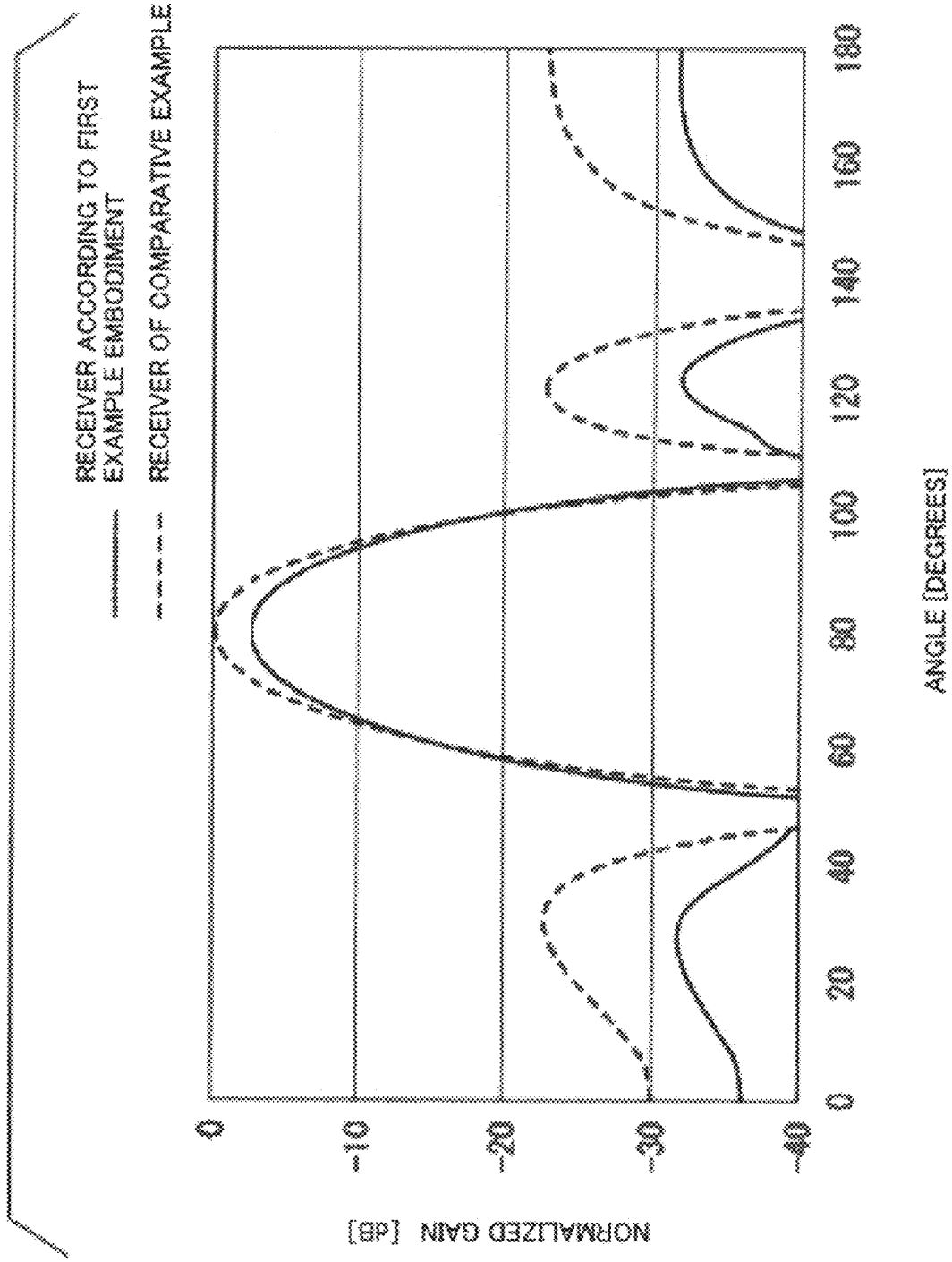
FIG. 6 is a second diagram illustrating the radiation pattern of the array antenna according to the first example embodiment.

For example, when the orientation of the main lobe of the first partial antenna 101ant1 is 65 degrees, the orientation of the main lobe of the second partial antenna 101ant2 is 75 degrees, the orientation of the main lobe of the third partial antenna 101ant3 is 85 degrees, and the orientation of the main lobe of the fourth partial antenna 101ant4 is 95 degrees, the control unit 70a1 calculates the power gain to be −4.1 dB from the power measured by the power detector 50a1 as illustrated in FIG. 5. (Note that the power gain illustrated in FIG. 5 is a normalized gain obtained by normalization using the maximum value of the power gain for the entire antenna 101.) In addition, the control unit 70a1 calculates the power gain to be −0.4 dB from the power measured by the power detector 50a2 as illustrated in FIG. 5. In addition, the control unit 70a1 calculates the power gain to be −0.4 dB from the power measured by the power detector 50a3 as illustrated in FIG. 5. In addition, the control unit 70a1 calculates the power gain to be −4.6 dB from the power measured by the power detector 50a4 as illustrated in FIG. 5. The power gain obtained by combining these four power gains, i.e., the power gain calculated from the power measured by the power detector 50a5 is the power gain illustrated in FIG. 6 with a solid line. The peak gain of the phased array receiver 1 according to the first example embodiment is reduced by about 2.6 dB as compared with the peak gain of the main lobe of the phased array receiver 1 of a comparative example illustrated in FIG. 7. However, the gain of the sidelobe of the phased array receiver 1 according to the first example embodiment is reduced as compared with the gain of the sidelobe of the phased array receiver of the comparative example. In addition, the degree of reduction in the gain of the sidelobe is greater than that of the main lobe. This finding indicates that the phased array receiver 1 according to the first example embodiment is less affected by a radio wave transmitted by a transmitting device other than the transmitting device 200 (not illustrated) to be communicated with as compared with the phased array receiver of the comparative example.

Figure 7:
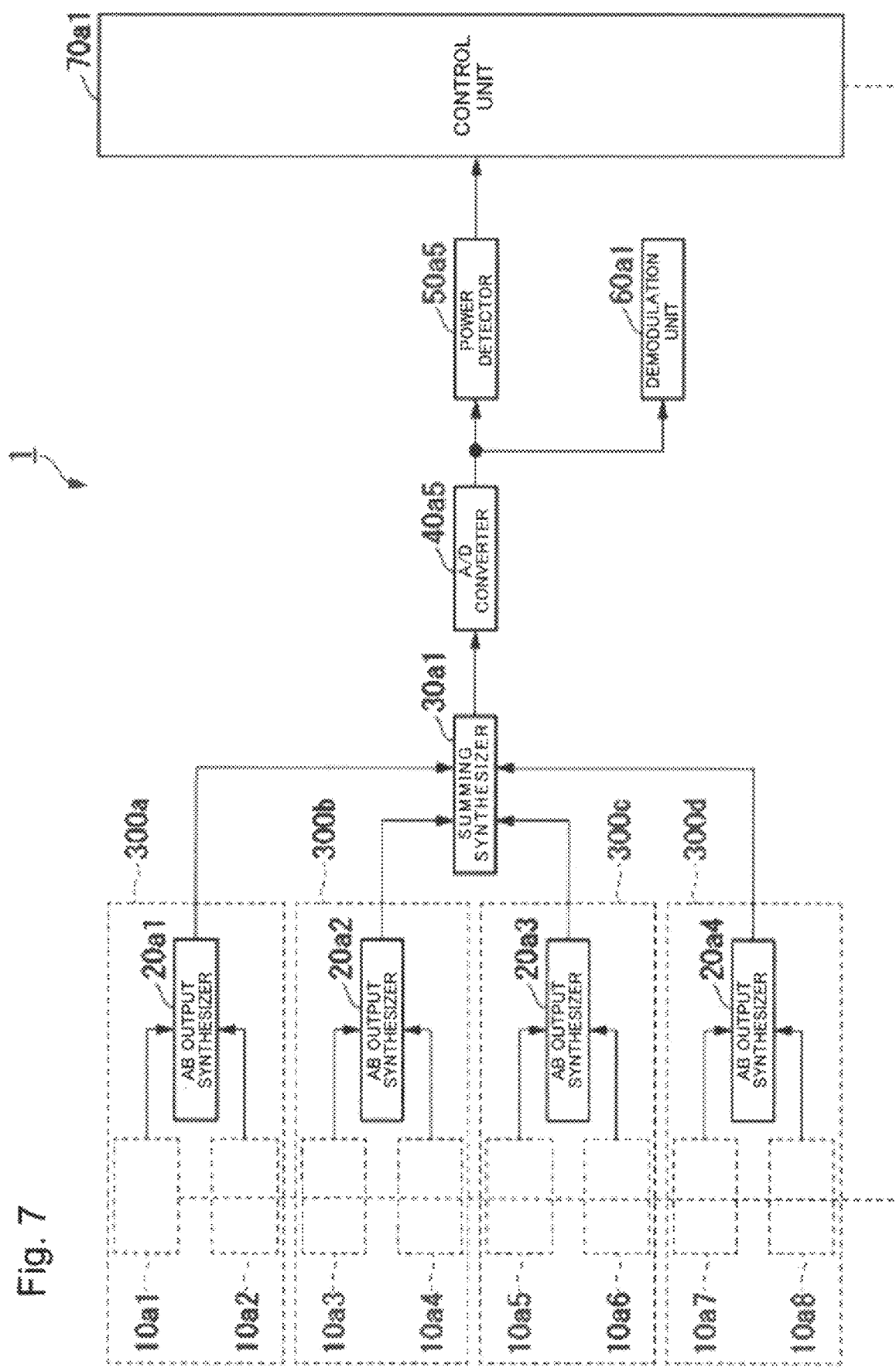
FIG. 7 is a diagram illustrating a configuration of a phased array receiver of a comparative example in the first example embodiment.

Note that the phased array receiver 1 of the comparative example illustrated in FIG. 7 is different from the phased array receiver 1 according to the first example embodiment in that the control unit 70a1 transmits, to each of the phase shifters 102a and 102b, a control signal for directing orientations of all the main lobes of the first partial antenna 101ant1 to the fourth partial antenna 101ant4 in the same direction and in the direction of the transmitting device 200 to be communicated with.

The control unit 70a1 determines whether the transmitting device 200 to be communicated with has moved (step S4).

More specifically, when the power gain has changed by the predetermined power gain or greater from the power gain of the last time when the control unit 70a1 determined that the transmitting device 200 had moved (the power gain obtained by shifting each of the orientations of the main lobes of the first partial antenna 101ant1 to the fourth partial antenna 101ant4 when the phased array receiver 1 just started communication), the control unit 70a1 determines that the transmitting device 200 has moved. In contrast, when the power gain has changed by a value less than the predetermined power gain from the power gain of the last time when the control unit 70a1 determined that the transmitting device 200 had moved, the control unit 70a1 determines that the transmitting device 200 has not moved.

In this case, the predetermined power gain is set to a value (for example, variation of 1 dB in the power gain) within a range where communication between the phased array receiver 1 and the transmitting device 200 can be maintained (within a range where communication is not lost) even when attenuation has occurred in the received signal due to difference in orientations of the main lobes of the first partial antenna 101ant1 to the fourth partial antenna 101ant4.

Note that, as a specific numerical example, in a condition in which the orientation of the main lobe of the first partial antenna 101ant1 is 65 degrees, the orientation of the main lobe of the second partial antenna 101ant2 is 75 degrees, the orientation of the main lobe of the third partial antenna 101ant3 is 85 degrees, and the orientation of the main lobe of the fourth partial antenna 101ant4 is 95 degrees, when the transmitting device 200 moves by −5 degrees from the direction of 80 degrees, i.e., from the direction of 80 degrees to the direction of 75 degrees, the control unit 70a1 calculates the power gain to be −1.6 dB from the power measured by the power detector 50a1. In addition, the control unit 70a1 calculates the power gain to be 0 dB from the power measured by the power detector 50a2. In addition, the control unit 70a1 calculates the power gain to be −1.8 dB from the power measured by the power detector 50a3. In addition, the control unit 70a1 calculates the power gain to be −9.3 dB from the power measured by the power detector 50a4.

Furthermore, in a condition in which the orientation of the main lobe of the first partial antenna 101ant1 is 65 degrees, the orientation of the main lobe of the second partial antenna 101ant2 is 75 degrees, the orientation of the main lobe of the third partial antenna 101ant3 is 85 degrees, and the orientation of the main lobe of the fourth partial antenna 101ant4 is 95 degrees, when the transmitting device 200 moves by +5 degrees from the direction of 80 degrees, i.e., from the direction of 80 degrees to the direction of 85 degrees, the control unit 70a1 calculates the power gain to be −8.6 dB from the power measured by the power detector 50a1. In addition, the control unit 70a1 calculates the power gain to be −1.8 dB from the power measured by the power detector 50a2. In addition, the control unit 70a1 calculates the power gain to be 0 dB from the power measured by the power detector 50a3. In addition, the control unit 70a1 calculates the power gain to be −1.9 dB from the power measured by the power detector 50a4.

The phased array receiver 1 obtains in advance, by an experiment or a simulation, the power gains upon receiving a plurality of signals having different radio wave strengths transmitted from a transmitting device located at a plurality of positions (angles and distances) in a condition, for example, in which the orientations of the main lobes of the first partial antenna 101ant1 to the fourth partial antenna 101ant4 are directed in different directions by 10 degrees from each other as described above. The phased array receiver 1 then stores a correspondence relationship of the power gain for each of the first partial antenna 101ant1 to the fourth partial antenna 101ant4 and the position of the transmitting device in a data table TBL1 (not illustrated) in advance.

When the control unit 70a1 determines that the transmitting device 200 has not moved (NO in step S4), the control unit 70a1 returns the process to step S3.

In contrast, when the control unit 70a1 determines that the transmitting device 200 has moved (YES in step S4), the control unit 70a1 compares the power gain calculated from the powers measured by the power detectors 50a1, 50a2, 50a3, and 50a4 with the power gains in the data table TBL1 (step S5).

The control unit 70a1 identifies a power gain that matches the power gain calculated from the powers measured by the power detectors 50a1, 50a2, 50a3, and 50a4 in the data table TBL1 (step S6). The control unit 70a1 determines the position corresponding to the power gain identified in the data table TBL1 to be the position of the transmitting device 200 after movement (step S7).

The control unit 70a1 returns the process to step S2, and, while keeping the amounts of differences in the directionalities of the first partial antenna 101ant 1 to the fourth partial antenna 101ant4, transmits a control signal for directing the main lobe of the antenna 101 in a direction of the position of the transmitting device 200 after movement to each of the phase shifters 102a and 102b.

In this manner, by measuring the variation in the received power, the phased array receiver 1 according to the first example embodiment can determine the direction in which the communication partner has moved.

The phased array receiver 1 according to the first example embodiment has been described as above. In the phased array receiver 1 according to the first example embodiment, the antenna unit 300a includes a plurality of antenna elements 101a and 101b and antenna block output synthesizers 20a1 to 20a4 (partial synthesizers), each of which outputs a second output signal by combining first output signals of the antenna elements 101a and 101b.

The power detectors 50a1 to 50a4 (partial power detection means) measure a signal strength of the second output signal output by the corresponding antenna block output synthesizers 20a1 to 20a4. The control unit 70a1 (position determination unit) locates the position of the transmitting device 200 (communication device) to be communicated with, on the basis of the measured signal strengths of the second output signals of the antenna block output synthesizers 20a1 to 20a4. The summing synthesizer 30a1 outputs a third output signal by combining the second output signals of the antenna units 300a. The control unit 70a1 (phase control unit) controls phases of the respective antenna elements 101a and 101b in such a way that the main lobe, the signal strength of which beam is the maximum of the third output signal output by the summing synthesizer 30a1, is directed to the position of the communication device 200 located by the control unit 70a1 (position determination unit).

In this manner, the phased array receiver 1 according to the first example embodiment can achieve a small circuit scale and direct a directionality of the antenna 101 to the communication device 200 to be communicated with by detecting movement of the communication device 200 to be communicated with.

Furthermore, in the phased array receiver 1 according to the first example embodiment, the control unit 70a1 (phase control unit) controls phases of the antenna elements 101a and 101b in such a way that the direction(s) of one or more main lobe(s) of the plurality of antenna units 300a and the direction(s) of the main lobe(s) of the other antenna unit(s) 300a of the plurality of antenna units 300a are different.

In this manner, the phased array receiver 1 according to the first example embodiment can adjust sensitivity for detecting movement of the communication device 200 to be communicated with. In addition, the phased array receiver 1 can adjust the directionality of the antenna 101.

Furthermore, in the phased array receiver 1 according to the first example embodiment, the demodulation unit 60a1 demodulates the signal combined by the summing synthesizer 30a1.

In this manner, the phased array receiver 1 according to the first example embodiment can read out information represented by the signal received from the communication device 200 to be communicated with.

Second Example Embodiment

A configuration of a phased array receiver 1 according to a second example embodiment will be described.

Figure 8:
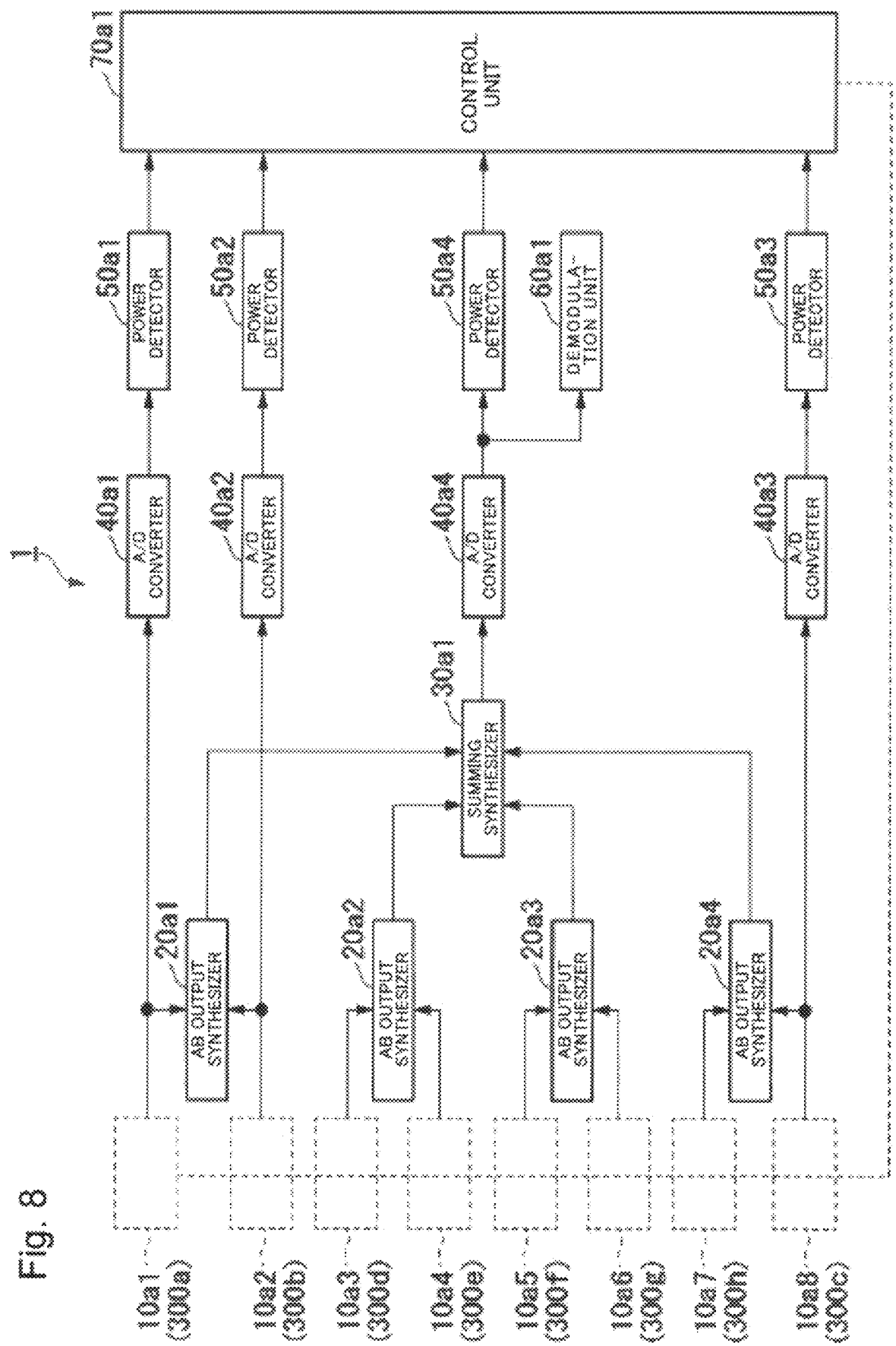
FIG. 8 is a diagram illustrating a configuration of a phased array receiver according to a second example embodiment.

The phased array receiver 1 according to the second example embodiment includes, as illustrated in FIG. 8, antenna blocks 10a1 to 10a8, antenna block output synthesizers 20a1 to 20a4, a summing synthesizer 30a1, A/D converters 40a1 to 40a4, power detectors 50a1 to 50a3 (partial power detection means), a power detector 50a4 (total power detection means), a demodulation unit 60a1, and a control unit 70a1 (a position determination unit and a phase control unit).

Hereinafter, the antenna blocks 10a1 to 10a8 are collectively referred to as antenna blocks 10a. In addition, the antenna block output synthesizers 20a1 to 20a4 are collectively referred to as antenna block output synthesizers 20a. Further, the A/D converters 40a1 to 40a4 are collectively referred to as A/D converters 40a. The power detectors 50a1 to 50a4 are also collectively referred to as power detectors 50a.

Each of the antenna blocks 10a includes, as illustrated in FIG. 2, antenna elements 101a and 101b, phase shifters 102a and 102b, and a phase shifter output synthesizer 103a (partial synthesizer).

The phase shifter output synthesizer 103a1 of the antenna block 10a1 transmits a combined signal to the antenna block output synthesizer 20a1 and the A/D converter 40a1.

The phase shifter output synthesizer 103a2 of the antenna block 10a2 transmits a combined signal to the antenna block output synthesizer 20a1 and the A/D converter 40a2.

The phase shifter output synthesizer 103a3 of the antenna block 10a3 transmits a combined signal to the antenna block output synthesizer 20a2.

The phase shifter output synthesizer 103a4 of the antenna block 10a4 transmits a combined signal to the antenna block output synthesizer 20a2.

The phase shifter output synthesizer 103a5 of the antenna block 10a5 transmits a combined signal to the antenna block output synthesizer 20a3.

The phase shifter output synthesizer 103a6 of the antenna block 10a6 transmits a combined signal to the antenna block output synthesizer 20a3.

The phase shifter output synthesizer 103a7 of the antenna block 10a7 transmits a combined signal to the antenna block output synthesizer 20a4.

The phase shifter output synthesizer 103a8 of the antenna block 10a8 transmits a combined signal to the antenna block output synthesizer 20a4 and the A/D converter 40a3.

The antenna block output synthesizer 20a1 receives a signal from the antenna block 10a1. In addition, the antenna block output synthesizer 20a1 receives a signal from the antenna block 10a2. The antenna block output synthesizer 20a1 combines the two received signals. The antenna block output synthesizer 20a1 transmits the combined signal to the summing synthesizer 30a1.

The antenna block output synthesizer 20a2 receives a signal from the antenna block 10a3. In addition, the antenna block output synthesizer 20a2 receives a signal from the antenna block 10a4. The antenna block output synthesizer 20a2 combines the two received signals. The antenna block output synthesizer 20a2 transmits the combined signal to the summing synthesizer 30a1.

The antenna block output synthesizer 20a3 receives a signal from the antenna block 10a5. In addition, the antenna block output synthesizer 20a3 receives a signal from the antenna block 10a6. The antenna block output synthesizer 20a3 combines the two received signals. The antenna block output synthesizer 20a3 transmits the combined signal to the summing synthesizer 30a1.

The antenna block output synthesizer 20a4 receives a signal from the antenna block 10a7. In addition, the antenna block output synthesizer 20a4 receives a signal from the antenna block 10a8. The antenna block output synthesizer 20a4 combines the two received signals. The antenna block output synthesizer 20a4 transmits the combined signal to the summing synthesizer 30a1.

The summing synthesizer 30a1 receives the signal from each of the antenna block output synthesizer 20a1 to the antenna block output synthesizer 20a4. The summing synthesizer 30a1 combines the four received signals. The summing synthesizer 30a1 transmits the combined signal to the A/D converter 40a4.

The A/D converter 40a1 receives the signal from the phase shifter output synthesizer 103a1. The A/D converter 40a1 converts the received signal from an analog signal to a digital signal. The A/D converter 40a1 transmits the converted digital signal to the power detector 50a1.

The A/D converter 40a2 receives the signal from the phase shifter output synthesizer 103a2. The A/D converter 40a2 converts the received signal from an analog signal to a digital signal. The A/D converter 40a2 transmits the converted digital signal to the power detector 50a2.

The A/D converter 40a3 receives the signal from the phase shifter output synthesizer 103a8. The A/D converter 40a3 converts the received signal from an analog signal to a digital signal. The A/D converter 40a3 transmits the converted digital signal to the power detector 50a3.

The A/D converter 40a4 receives the signal from the summing synthesizer 30a1. The A/D converter 40a4 converts the received signal from an analog signal to a digital signal. The A/D converter 40a4 transmits the converted digital signal to the power detector 50a4 and the demodulation unit 60a1.

The power detector 50a1 receives the signal from the A/D converter 40a1. The power detector 50a1 measures a power of the received signal. The power detector 50a1 transmits a value of the measured power to the control unit 70a1.

The power detector 50a2 receives the signal from the A/D converter 40a2. The power detector 50a2 measures a power of the received signal. The power detector 50a2 transmits a value of the measured power to the control unit 70a1.

The power detector 50a3 receives the signal from the A/D converter 40a3. The power detector 50a3 measures a power of the received signal. The power detector 50a3 transmits a value of the measured power to the control unit 70a1.

The power detector 50a4 receives the signal from the A/D converter 40a4. The power detector 50a4 measures a power of the received signal. The power detector 50a4 transmits a value of the measured power to the control unit 70a1.

The demodulation unit 60a1 receives the signal from the A/D converter 40a4. The demodulation unit 60a1 demodulates the received signal.

The control unit 70a1 receives the value of the measured power from each of the power detectors 50a. The control unit 70a1 calculates a power gain from the received value of the power. The control unit 70a1 transmits, to the phase shifter 102a, a control signal for adjusting phases of the phase shifter 102a according to the calculated power gain, i.e., the strength of the received signal. In addition, the control unit 70a1 transmits, to the phase shifter 102b, a control signal for adjusting phases of the phase shifter 102b according to the calculated power gain.

The antenna elements constituting the antenna 101 in the second example embodiment are arranged in the antenna 101, similarly to the antenna elements in the second example embodiment, as illustrated in FIG. 3, in a straight line at equal intervals in the order of the antenna elements 101a*l*, 101b1, 101a2, 101b2, 101a3, 101b3, 101a4, 101b4, 101a5, 101b5, 101a6, 101b6, 101a7, 101b7, 101a8, and 101b8.

Note that, in the second example embodiment, it is defined that a single antenna unit is composed of a functional unit from the antenna elements 101a and 101b to the synthesizer (partial synthesizer) serving as a stage preceding an A/D converter 40a, in which a signal passes through; in other words, a single antenna unit is composed of the antenna elements 101a and 101b each having the same directionality and the phase shifter output synthesizer 103a (partial synthesizer) that combines signals received by respective antenna elements 101a and 101b.

More specifically, the antenna block 10a1 constitutes an antenna unit 300a. In addition, the antenna block 10a2 constitutes an antenna unit 300b. In addition, the antenna block 10a8 constitutes an antenna unit 300c.

Despite not being connected to the A/D converter 40a, each of the antenna blocks 10a3 to 10a7 having the same directionality as the antenna block 10a2 may be considered as an antenna unit.

More specifically, the antenna block 10a3 constitutes an antenna unit 300d. The antenna block 10a4 constitutes an antenna unit 300e. The antenna block 10a5 constitutes an antenna unit 300f. The antenna block 10a6 constitutes an antenna unit 300g. The antenna block 10a7 constitutes an antenna unit 300h. In the second example embodiment, the antenna units 300a, 300b, 300c, 300d, 300e, 300f, 300g, and 300h are also referred to as antenna units 300a.

In the phased array receiver 1 according to the first example embodiment, each antenna unit that includes four antenna elements has a different directionality. On the other hand, in the phased array receiver 1 according to the second example embodiment, two of the antenna units the positions of which are the farthest from each other and each of which includes two antenna elements have a different directionality from other antenna units.

Specific Example 2

Figure 9:
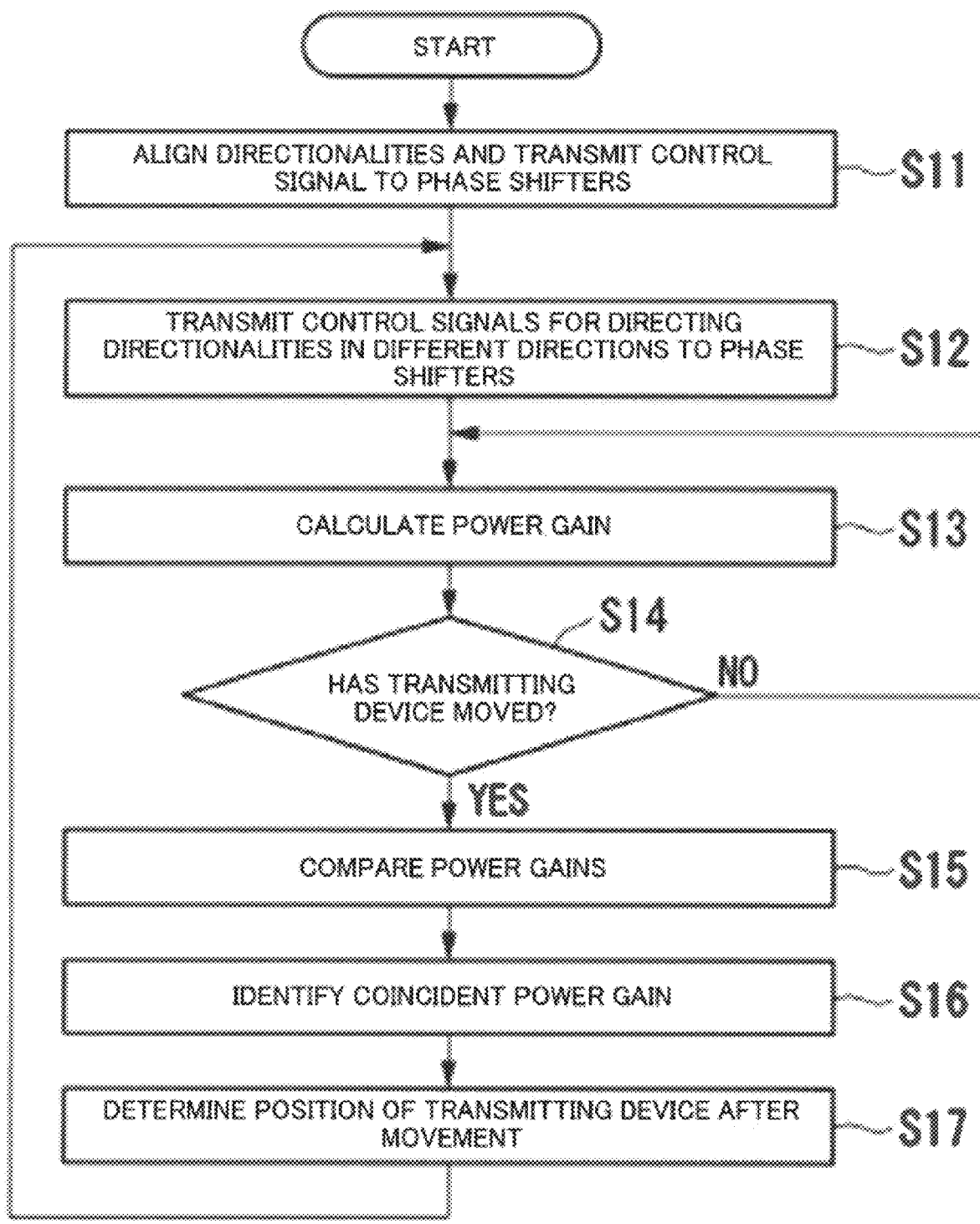
FIG. 9 is a diagram illustrating a processing sequence of the phased array receiver according to the second example embodiment.

Next, the processing sequence illustrated in FIG. 9 will be described, in which the phased array receiver 1 according to the second example embodiment detects movement of a transmitting device to be communicated with.

Figure 10:
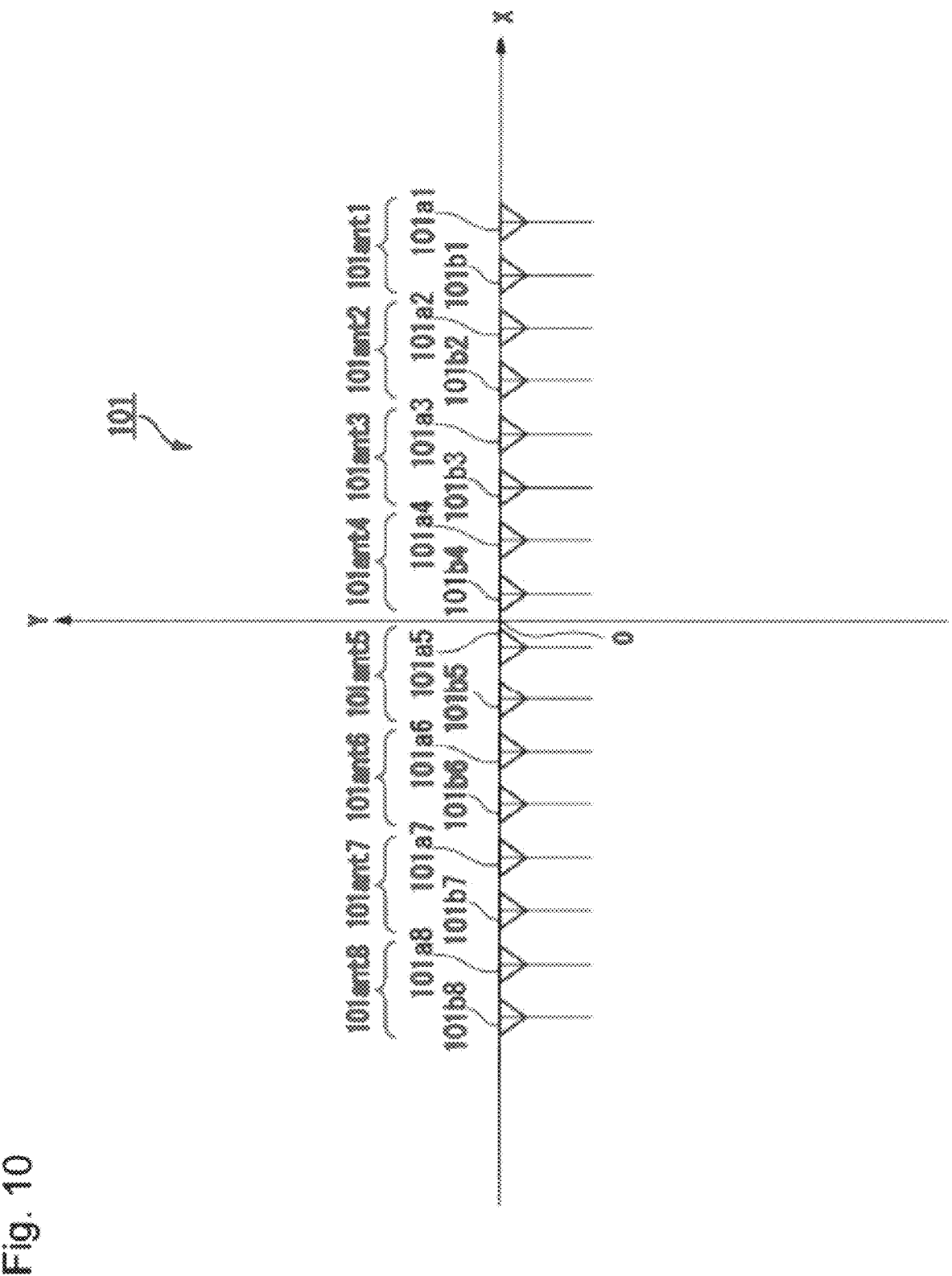
FIG. 10 is a diagram illustrating an antenna element constituting an antenna according to the second example embodiment.

Note that, in the second example embodiment, as illustrated in FIG. 10, the antenna elements 101a1 and 101b1 are referred to as a first partial antenna 101ant1. The antenna elements 101a2 and 101b2 are referred to as a second partial antenna 101*ant*2. The antenna elements 101*a*3 and 101*b*3 are referred to as a third partial antenna 101*ant*3. The antenna elements 101*a*4 and 101*b*4 are referred to as a fourth partial antenna 101*ant*4. The antenna elements 101*a*5 and 101*b*5 are referred to as a fifth partial antenna 101*ant*5. The antenna elements 101*a*6 and 101*b*6 are referred to as a sixth partial antenna 101*ant*6. The antenna elements 101*a*7 and 101*b*7 are referred to as a seventh partial antenna 101*ant*7. The antenna elements 101*a*8 and 101*b*8 are referred to as an eighth partial antenna 101*ant*8.

Immediately after the phased array receiver 1 according to the second example embodiment starts communication, the control unit 70*a*1 aligns the eight directionalities of the first partial antenna 101*ant*1 to the eighth partial antenna 101*ant*8 and transmits, to each of the phase shifters 102*a* and 102*b*, a control signal by which the partial antennas are oriented in a direction where the strength of a radio wave is strong by means of a beamformer method or the like, i.e., a direction where a power indicated by the power detector 50*a*4 is maximum (step S11).

More specifically, the control unit 70*a*1 varies, for example, by varying a value of the control signal, orientations of eight main lobes from 0 degrees and 360 degrees, the eight main lobes of the first partial antenna 101*ant* 1 to the eight partial antenna 101*ant*8 being directed in the same direction. The control unit 70*a*1 identifies a control signal with which the power indicated by the power detector 50*a*4 is maximum.

The control unit 70*a*1 transmits, to each of the phase shifters 102*a*2 to 102*a*7 and 102*b*2 to 102*b*7, a control signal for directing the orientations of the main lobes of the second partial antenna 101*ant*2 to the seventh partial antenna 101*ant*7 in the direction identified above in which the power indicated by the power detector 50*a*4 is maximum. Then, the control unit 70*a*1 transmits, to each of the phase shifters 102*a*1, 102*a*8, 102*b*1, and 102*b*8, a control signal for directing each directionality of the first partial antenna 101*ant*1 and the eighth partial antenna 101*ant*8 in a direction different from those of the second partial antenna 101*ant*2 to the seventh partial antenna 101*ant*7 (step S12).

More specifically, for example, when the direction in which the power indicated by the power detector 50*a*4 is maximum is a direction of 80 degrees on the X-Y plane, the control unit 70*a*1 transmits, to each of the phase shifters 102*a*1 to 102*a*7 and 102*b*1 to 102*b*7, a control signal for directing the orientations of the main lobes of the second partial antenna 101*ant*2 to the seventh partial antenna 101*ant*7 in a direction of 80 degrees. In addition, the control unit 70*a*1 transmits, to each of the phase shifters 102*a*1 and 102*b*1, a control signal for directing the orientation of the main lobe of the first partial antenna 101*ant*1 in a direction of 70 degrees. In addition, the control unit 70*a*1 transmits, to each of the phase shifters 102*a*8 and 102*b*8, a control signal for directing the orientation of the main lobe of the eighth partial antenna 101*ant*8 in a direction of 90 degrees.

The control unit 70*a*1 calculates a power gain for every predetermined time interval (step S13).

Figure 11:
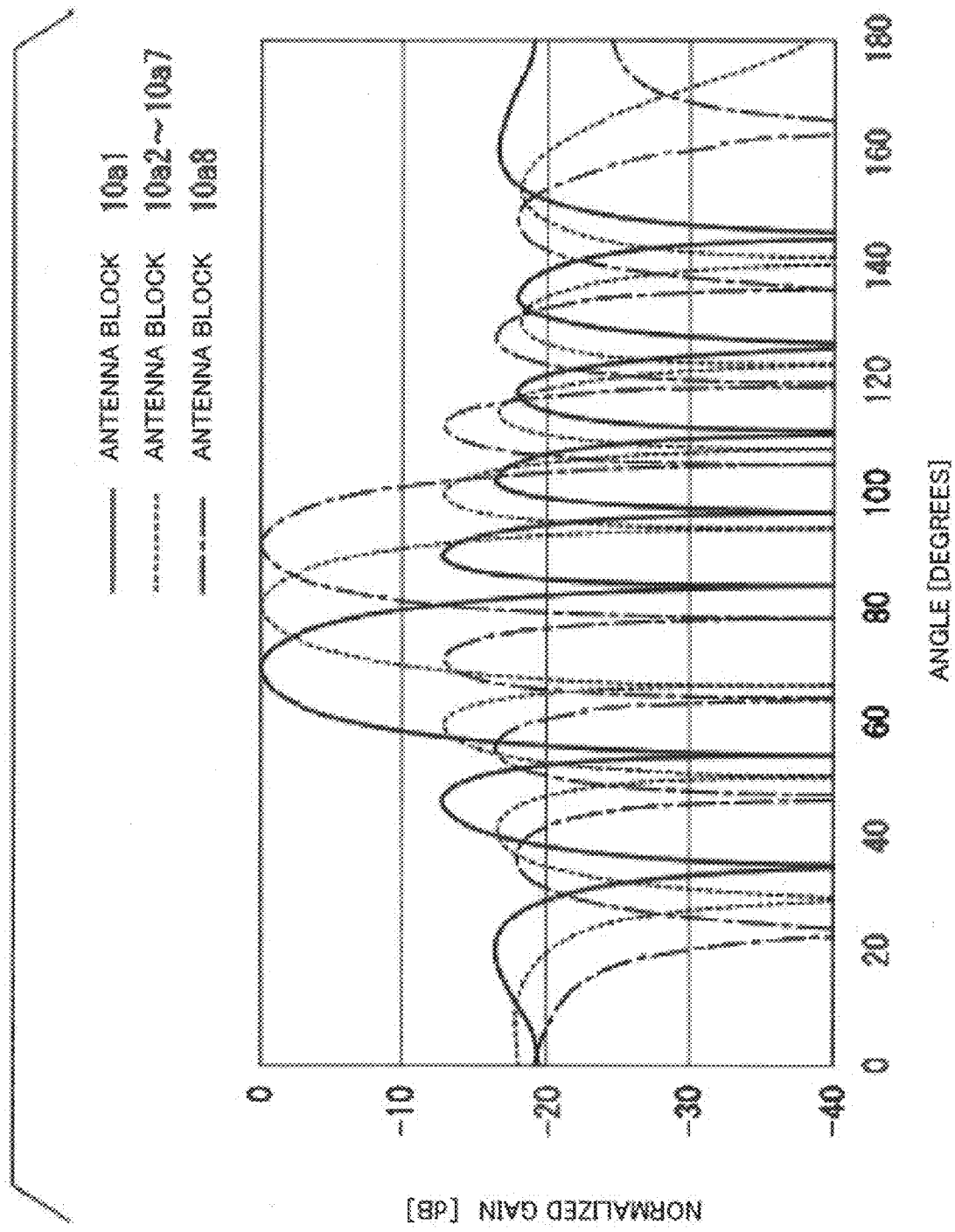
FIG. 11 is a first diagram illustrating a radiation pattern of an array antenna according to the second example embodiment.
Figure 12:
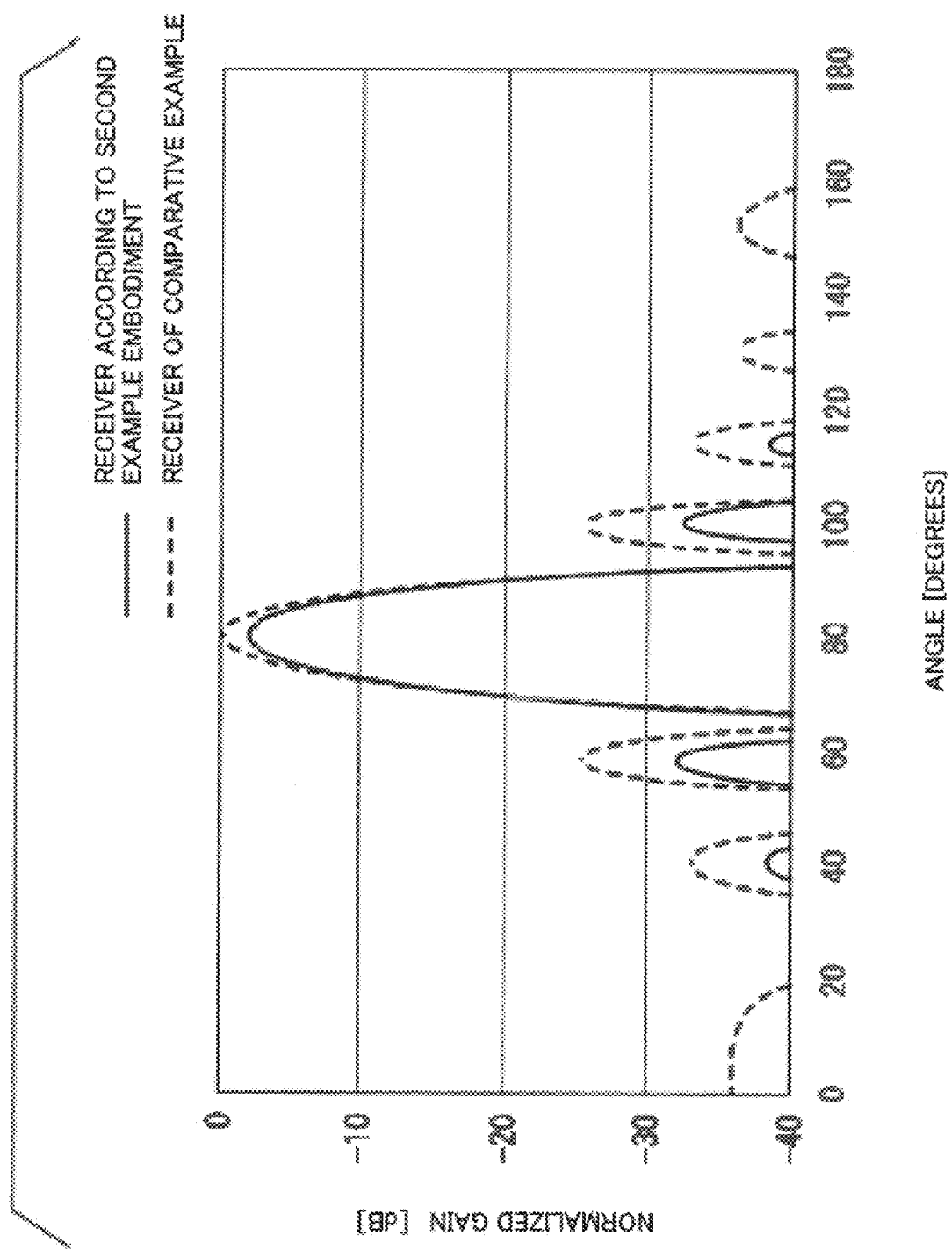
FIG. 12 is a second diagram illustrating the radiation pattern of the array antenna according to the second example embodiment.

For example, when the orientation of the main lobe of the first partial antenna 101*ant*1 is 70 degrees, the orientations of the main lobes of the second partial antenna 101*ant*2 to the seventh partial antenna 101*ant*7 are 80 degrees, and the orientation of the main lobe of the eighth partial antenna 101*ant*8 is 90 degrees, the control unit 70*a*1 calculates the power gain to be −11.6 dB from the power measured by the power detector 50*a*1 as illustrated in FIG. 11. (Note that the power gain illustrated in FIG. 11 is a normalized gain obtained by normalization using the maximum value of the power gain for the entire antenna 101.) In addition, the control unit 70*a*1 calculates the power gain to be 0 dB from the power measured by the power detector 50*a*2 as illustrated in FIG. 11. In addition, the control unit 70*a*1 calculates the power gain to be −11.3 dB from the power measured by the power detector 50*a*3 as illustrated in FIG. 11. Note that the power gains for the antenna blocks 10*a*3 to 10*a*7 in FIG. 11 are, since the orientations of the main lobes of the second partial antenna 101*ant*2 to the seventh partial antenna 101*ant*7 are 80 degrees, which is the direction of the transmitting device 200 to be communicated with, 0 dB as is the value of the antenna block 10*a*2. In addition, the power gain obtained by combining these eight power gains, i.e., the power gain calculated from the power measured by the power detector 50*a*4 is the power gain illustrated in FIG. 12. The peak gain of the phased array receiver 1 according to the second example embodiment is reduced as compared with the peak gain achieved by the related technique, similarly to the phased array receiver 1 according to the first example embodiment; however, the gain of the sidelobe is also reduced as compared with the gain of the sidelobe achieved by the related technique. This finding indicates that the phased array receiver 1 according to the second example embodiment is less affected by a radio wave transmitted by a transmitting device other than the transmitting device 200 to be communicated with as compared with the receiver by means of the related technique.

Note that the peak gain of the phased array receiver 1 according to the second example embodiment is higher than that of the phased array receiver 1 according to the first example embodiment since the main lobes of the second partial antenna 101*ant*2 to the seventh partial antenna 101*ant*7 are directed in the direction of the transmitting device 200.

The control unit 70*a*1 determines whether the transmitting device 200 to be communicated with has moved (step S14).

More specifically, when the power gain has changed by the predetermined power gain or greater from the power gain of the last time when the control unit 70*a*1 determined that the transmitting device 200 had moved (the power gain obtained by shifting each of the orientations of the main lobes of the first partial antenna 101*ant*1 and the eighth partial antenna 101*ant*8 when the phased array receiver 1 just started communication), the control unit 70*a*1 determines that the transmitting device 200 has moved. In contrast, when the power gain has changed by a value less than the predetermined power gain from the power gain of the last time when the control unit 70*a*1 determined that the transmitting device 200 had moved, the control unit 70*a*1 determines that the transmitting device 200 has not moved.

In this case, the predetermined power gain is set to a value (for example, variation of 1 dB in the power gain) within a range where communication between the phased array receiver 1 and the transmitting device 200 can be maintained even when attenuation has occurred in the received signal due to difference in orientations of the main lobes of the first partial antenna 101*ant*1 and the eighth partial antenna 101*ant*8.

Note that, as a specific numerical example, in a condition in which the orientation of the main lobe of the first partial antenna 101*ant*1 is 70 degrees, the orientations of the main lobe of the second partial antenna 101*ant*2 to the seventh partial antenna 101*ant*7 are 80 degrees, and the orientation of the main lobe of the eighth partial antenna 101*ant*8 is 90 degrees, when the transmitting device 200 moves by −5 degrees from the direction of 80 degrees, i.e., from the direction of 80 degrees to the direction of 75 degrees, the control unit 70*a*1 calculates the power gain to be −17.7 dB from the power measured by the power detector 50*a*1. In addition, the control unit 70*a*1 calculates the power gain to be −1.98 dB from the power measured by the power detector 50*a*2. In addition, the control unit 70*a*1 calculates the power gain to be −2.98 dB from the power measured by the power detector 50*a*3.

The phased array receiver 1 obtains in advance, by an experiment or a simulation, the power gains upon receiving a plurality of signals having different radio wave strengths transmitted from the transmitting device 200 located at a plurality of positions (angles and distances), in a condition, for example, in which the orientations of the main lobes of the first partial antenna 101*ant*1, the second partial antenna 101*ant*2 to the seventh partial antenna 101*ant*7, and the eighth partial antenna 101*ant*8 are directed in different directions by 10 degrees from each other as described above. The phased array receiver 1 then stores a correspondence relationship of the power gain for each of the first partial antenna 101*ant*1 to the eighth partial antenna 101*ant*8 and the position of the transmitting device 200 in a data table TBL1 in advance.

When the control unit 70*a*1 determines that the transmitting device 200 has not moved (NO in step S14), the control unit 70*a*1 returns the process to step S13.

In contrast, when the control unit 70*a*1 determines that the transmitting device 200 has moved (YES in step S14), the control unit 70*a*1 compares the power gain calculated from the powers measured by the power detectors 50*a*1, 50*a*2, 50*a*3, and 50*a*4 with the power gains in the data table TBL1 (step S15).

The control unit 70*a*1 identifies a power gain that matches the calculated power gain in the data table TBL1 (step S16). The control unit 70*a*1 determines the position corresponding to the power gain identified in the data table TBL1 to be the position of the transmitting device 200 after movement (step S17).

The control unit 70*a*1 returns the process to step S12, and, while keeping the amounts of differences in the directionalities of the first partial antenna 101*ant*1 and the eighth partial antenna 101*ant*8, transmits a control signal by which the main lobe of the antenna 101 is directed in a direction of the position of the transmitting device 200 after movement to each of the phase shifters 102*a* and 102*b*.

In this manner, by measuring the variation in the received power, the phased array receiver 1 according to the second example embodiment can determine the direction in which the communication partner has moved.

The phased array receiver 1 according to the second example embodiment has been described as above. In the phased array receiver 1 according to the second example embodiment, the antenna unit 300*a* includes a plurality of antenna elements 101*a* and 101*b* and a phase shifter output synthesizer 103*a* (partial synthesizers), which outputs a second output signal by combining first output signals of the antenna elements 101*a* and 101*b*. The power detectors 50*a*1 to 50*a*3 (partial power detection means) measure a signal strength of the second output signal output by the corresponding phase shifter output synthesizer 103*a*. The control unit 70*a*1 (position determination unit) locates the position of the transmitting device 200 (communication device) to be communicated with, on the basis of the measured signal strengths of the second output signals of the antenna block output synthesizers 20*a*1 and 20*a*4.

The summing synthesizer 30*a*1 outputs a third output signal by combining the second output signals of the antenna units 300*a*. The control unit 70*a*1 (phase control unit) controls phases of the respective antenna elements 101*a* and 101*b* in such a way that the main lobe, the signal strength of which beam is the maximum of the third output signal output by the summing synthesizer 30*a*1, is directed to the position of the communication device 200 located by the control unit 70*a*1 (position determination unit).

In this manner, the phased array receiver 1 according to the second example embodiment can achieve a small circuit scale and direct a directionality of the array antenna 101 to the communication device 200 to be communicated with by detecting movement of the communication device 200 to be communicated with.

The phased array receiver 1 according to the second example embodiment can also increase the directivity of the main lobe, the signal strength of which beam is the maximum of the output signal of the summing synthesizer 30*a*1, i.e., the directivity of the array antenna 101 as compared with the phased array receiver 1 according to the first example embodiment.

Note that, although the power detector according to the first and second example embodiments is assumed to be a digital circuit, the present invention is not limited to this configuration. The power detector according to the first and second example embodiments may be an analog circuit provided between a synthesizer and an A/D converter.

Note that, although the array antenna 101 according to the first and second example embodiments has an arrangement in a straight line at equal intervals, the array antenna 101 according to the first and second example embodiments is not limited to this arrangement.

Furthermore, although, in the first and second example embodiments, only the phases of the received signals are varied, the amplitudes may also be adjusted at the same time as commonly practiced in beamforming.

Note that the number of the antenna blocks 10*a* in the first and second example embodiments is not limited to eight. The number of the antenna blocks 10*a* may be an even number or an odd number as long as it is two or more.

In addition, that the number of the antenna elements of the antenna blocks 10*a* in the first and second example embodiments is not limited to two. The number of the antenna elements may be an even number or an odd number as long as it is two or more. Note that, in this case, one phase shifter is connected to each antenna element and all output signals of the phase shifters are combined by a phase shifter output synthesizer 103*a*.

<Minimum Configuration>

Next, the phased array receiver 1 in a minimum configuration according to the example embodiments will be described.

Figure 13:
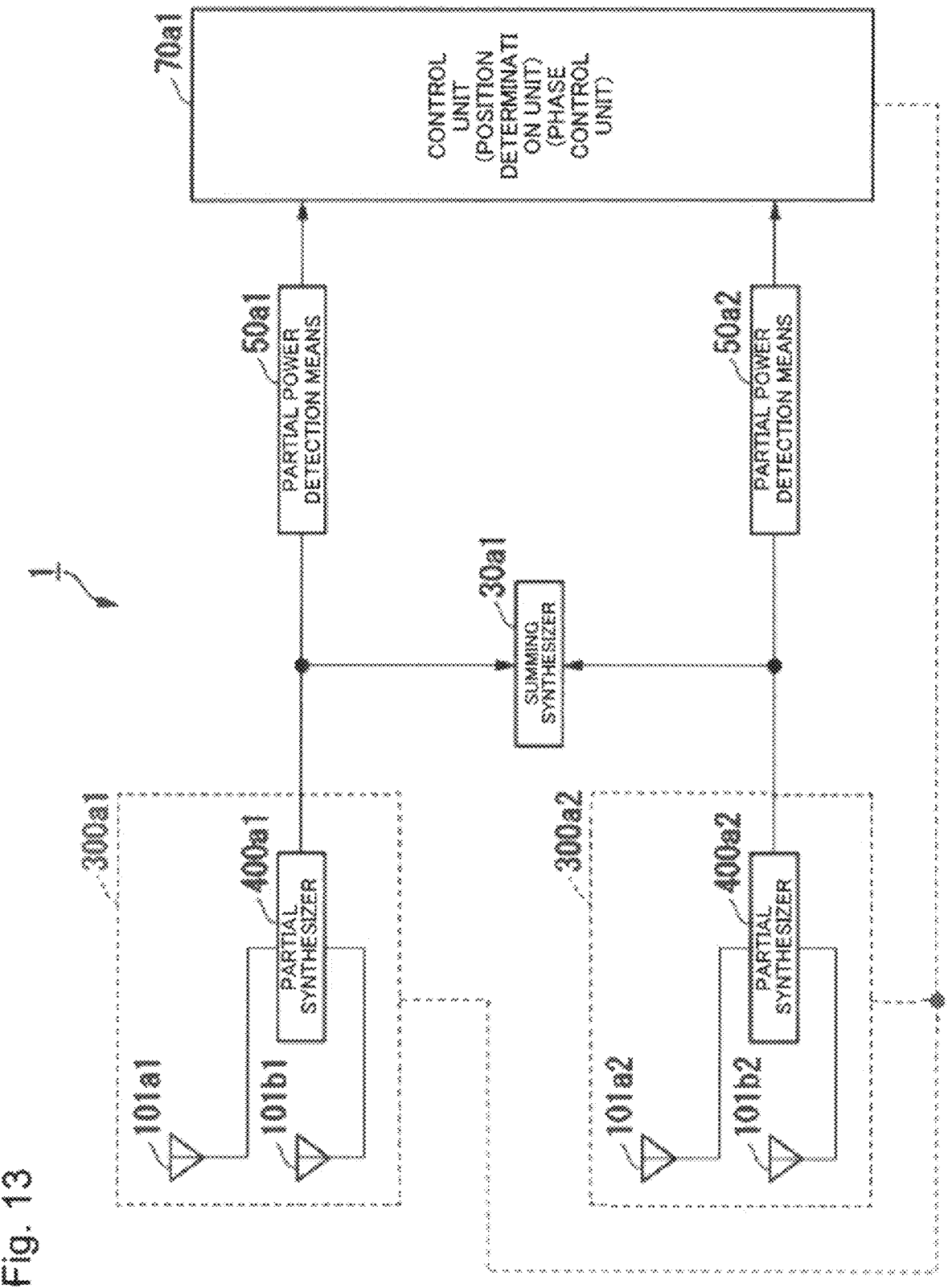
FIG. 13 is a diagram illustrating a phased array receiver in a minimum configuration according to the example embodiments.

The phased array receiver 1 (wireless communication device) in a minimum configuration according to the example embodiments includes, as illustrated in FIG. 13, antenna units 300*a*1 and 300*a*2, partial power detection means 50*a*1 and 50*a*2, a control unit 70*a*1 (a position determination unit and a phase control unit), and a summing synthesizer 30*a*1.

The antenna unit 300*a*1 includes antenna elements 101*a*1 and 101*b*1. In addition, the antenna unit 300*a*1 includes a partial synthesizer 400*a*1 that combines output signals of the antenna elements 101*a*1 and 101*b*1.

The antenna unit 300*a*2 includes antenna elements 101*a*1 and 101*b*1. In addition, the antenna unit 300*a*2 includes a partial synthesizer 400*a*2 that combines output signals of the antenna elements 101*a*1 and 101*b*1.

The partial power detection means 50*a*1 measures a signal strength of an output signal of the partial synthesizer 400*a*1.

The partial power detection means 50a2 measures a signal strength of an output signal of the partial synthesizer 400a2.

The control unit 70a1 (position determination unit) locates the position of the communication device 200 to be communicated with, on the basis of the signal strengths of the output signals of the partial synthesizers 400a1 and 400a2.

The summing synthesizer 30a1 combines output signals of the antenna units 300a1 and 300a2.

The control unit 70a1 (phase control unit) controls phases of the respective antenna elements 101a and 101b in such a way that the main lobe, the signal strength of which beam is the maximum of an output signal of the summing synthesizer 30a1, is directed to the position of the communication device 200 located by the control unit 70a1 (position determination unit).

In this manner, the phased array receiver 1 can achieve a small circuit scale and direct a directionality of an array antenna 101 to the communication device 200 to be communicated with by detecting movement of the communication device 200 to be communicated with.

Note that the processes in each example embodiment described above, may be in a different sequence as long as the processes are properly performed.

Each of a storage unit and another storage device in each example embodiment described above may be provided anywhere as long as information is properly transmitted/received. In addition, there may be a plurality of storage units and a plurality of other storage devices and data may be stored in a distributed manner as long as information is properly transmitted/received.

Although a plurality of example embodiments have been described, the control unit and other control devices of the phased array receiver 1 described above may include a computing system therein. Steps of the aforementioned processes are stored in the form of a program on a computer-readable recording medium, and the aforementioned processes are executed by the computer (processor) reading out and executing the program. The computer-readable recording medium is a magnetic disc, a magneto-optical disc, a CD-ROM, a DVD-ROM, a semiconductor memory, or the like. Furthermore, the computer program may be distributed to a computer via a communication line and the computer that receives the distributed copy may execute the program.

The aforementioned program may implement a part of the functions described above. Furthermore, the aforementioned program may be a file that implements the functions described above in combination with a program already recorded in the computing system; in other words, the program may be a so-called differential file (differential program).

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-211428, filed on Oct. 28, 2016, the disclosure of which is incorporated herein in its entirety by reference.

INDUSTRIAL APPLICABILITY

According to the present invention, a small circuit scale can be achieved and a directionality of an antenna can be directed to a communication device to be communicated with by detecting movement of the communication device to be communicated with.

REFERENCE SIGNS LIST 1 phased array receiver
10a1 to 10a8 antenna block
20a1 to 20a4 antenna block output synthesizer
30a1 summing synthesizer
40a1 to 40a5 A/D converter
50a1 to 50a5 power detector
60a1 demodulation unit
70a1 control unit
101 array antenna
101a, 101a1 to 101a8, 101b, 101b1 to 101b8 antenna element
101ant1 first partial antenna
101ant2 second partial antenna
101ant3 third partial antenna
101ant4 fourth partial antenna
101ant5 fifth partial antenna
101ant6 sixth partial antenna
101ant7 seventh partial antenna
101ant8 eighth partial antenna
102a, 102a1 to 102a8, 102b, 102b1 to 102b8 phase shifter
103a, 103a1 to 103a8 phase shifter output synthesizer
200 transmitting device
300a1 to 300a4, 300a to 300h antenna unit

The invention claimed is:

1. A wireless communication device comprising:
a plurality of antenna units each including a plurality of antenna elements and a partial synthesizer that outputs a second output signal by combining first output signals of the antenna elements;
a partial power detection unit configured to measure a signal strength of each of the second output signals;
a position determination unit configured to locate a position of a communication device being a communication target, based on the measured signal strengths of the second output signals;
a summing synthesizer that outputs a third output signal by combining the second output signals of the plurality of antenna units; and
a phase control unit configured to control a phase of the each antenna element in such a way that a main lobe being a beam having a maximum signal strength of the third output signal is directed to the position of the communication device located by the position determination unit.

2. The wireless communication device according to claim 1, wherein
the phase control unit controls the phase of the each antenna element in such a way that directions of one or more main lobes of the plurality of antenna units are different from a direction of a main lobe of another antenna unit of the plurality of antenna units.

3. The wireless communication device according to claim 1, further comprising:
a demodulation unit configured to modulate the third output signal.

4. A control method, comprising:
outputting a second output signal by combining first output signals of a plurality of antenna elements;
measuring a signal strength of each of a plurality of the second output signals;

locating a position of a communication device being a communication target, based on the measured signal strength of each of the second output signals;
outputting a third output signal by combining the plurality of second output signals; and
controlling a phase of the each antenna element in such a way that a main lobe being a beam having a maximum signal strength of the third output signal is directed to the located position of the communication device.

5. A non-transitory storage medium having a program stored therein, the program causing a computer to execute:
outputting a second output signal by combining first output signals of a plurality of antenna elements;
measuring a signal strength of each of a plurality of the second output signals;
locating a position of a communication device being a communication target, based on the measured signal strength of each of the second output signals;
outputting a third output signal by combining the plurality of second output signals; and
controlling a phase of the each antenna element in such a way that a main lobe being a beam having a maximum signal strength of the third output signal is directed to the located position of the communication device.

* * * * *